(12) United States Patent
Bergström et al.

(10) Patent No.: US 12,524,117 B2
(45) Date of Patent: Jan. 13, 2026

(54) OPTICAL COUPLING IN TOUCH-SENSING SYSTEMS

(71) Applicant: FlatFrog Laboratories AB, Lund (SE)

(72) Inventors: Håkan Bergström, Torna Hällestad (SE); Aleksander Kocovski, Malmö (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 18/982,359

(22) Filed: Dec. 16, 2024

(65) Prior Publication Data

US 2025/0341923 A1    Nov. 6, 2025

Related U.S. Application Data

(63) Continuation of application No. 18/348,273, filed on Jul. 6, 2023, now Pat. No. 12,175,044, which is a
(Continued)

(30) Foreign Application Priority Data

Feb. 6, 2017    (EP) .................................... 17154898

(51) Int. Cl.
*G06F 3/042*   (2006.01)
(52) U.S. Cl.
CPC .......... *G06F 3/0428* (2013.01); *G06F 3/0421* (2013.01); *G06F 2203/04107* (2013.01)
(58) Field of Classification Search
CPC .................. G06F 3/0428; G06F 3/0421; G06F 2203/04107; G06F 3/042; F21V 8/00; B23P 17/04
See application file for complete search history.

(56) References Cited

U.S. PATENT DOCUMENTS 3,375,053 A    3/1968  Ward
3,440,426 A    4/1969  Bush
(Continued)

FOREIGN PATENT DOCUMENTS

AU    2008280952 A1    3/2009
AU    2014201966 A1    4/2014
(Continued)

OTHER PUBLICATIONS

Tympanus/Codrops | Animated Mesh Lines, posted on Jan. 8, 2019 by Jeremie Boulay, © Codrops 2020 [online], [site visited Oct. 13, 2020], Available from Internet, <URL: https://tympanus.net/codrops/2019/01/08/animated-mesh-lines/>.
(Continued)

*Primary Examiner* — Michael A Faragalla
(74) *Attorney, Agent, or Firm* — Knobbe, Martens, Olson & Bear, LLP

(57) ABSTRACT

A touch sensing apparatus is disclosed, comprising a light transmissive panel that defines a touch surface, an opposite rear surface, and panel sides extending between the touch surface and rear surface. The panel sides define a perimeter of the light transmissive panel. The touch sensing apparatus comprises a plurality of light emitters and detectors arranged along the perimeter and adjacent the panel sides, a light guide arranged along the perimeter and having a first reflective surface comprising a diffusive light scattering element. The light emitters are arranged to emit a respective beam of light onto the diffusive light scattering element so as to generate propagating light that diffusively propagates above the touch surface, wherein the light detectors are arranged to receive detection light generated as said propagating light impinges on the diffusive light scattering element, and wherein the diffusive light scattering element is arranged at
(Continued)

least partly outside the panel sides and extending at least partly above the touch surface.

7 Claims, 10 Drawing Sheets

Related U.S. Application Data continuation of application No. 17/947,919, filed on Sep. 19, 2022, now Pat. No. 11,740,741, which is a continuation of application No. 17/216,219, filed on Mar. 29, 2021, now Pat. No. 11,474,644, which is a continuation of application No. 16/313,820, filed as application No. PCT/EP2018/052757 on Feb. 5, 2018, now Pat. No. 10,963,104.

(56) References Cited

U.S. PATENT DOCUMENTS

| | | |
|---|---|---|
| 3,478,220 A | 11/1969 | Milroy |
| 3,553,680 A | 1/1971 | Cooreman |
| 3,673,327 A | 6/1972 | Johnson et al. |
| 4,129,384 A | 12/1978 | Walker et al. |
| 4,180,702 A | 12/1979 | Hartmann et al. |
| 4,209,255 A | 6/1980 | Heynau et al. |
| 4,213,707 A | 7/1980 | Evans, Jr. |
| 4,254,333 A | 3/1981 | Arne |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,459,476 A | 7/1984 | Weissmueller et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,751,379 A | 6/1988 | Sasaki et al. |
| 4,752,655 A | 6/1988 | Tajiri et al. |
| 4,766,424 A | 8/1988 | Adler et al. |
| 4,772,763 A | 9/1988 | Garwin et al. |
| 4,782,328 A | 11/1988 | Denlinger |
| 4,812,833 A | 3/1989 | Shimauchi |
| 4,820,050 A | 4/1989 | Griffin |
| 4,837,430 A | 6/1989 | Hasegawa |
| 4,868,550 A | 9/1989 | Sasaki et al. |
| 4,868,912 A | 9/1989 | Doering |
| 4,891,829 A | 1/1990 | Deckman et al. |
| 4,916,308 A | 4/1990 | Meadows |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 4,994,677 A | 2/1991 | Graindorge |
| 5,065,185 A | 11/1991 | Powers et al. |
| 5,073,770 A | 12/1991 | Lowbner |
| 5,105,186 A | 4/1992 | May |
| 5,115,677 A | 5/1992 | Martin et al. |
| 5,155,813 A | 10/1992 | Donoghue et al. |
| 5,159,322 A | 10/1992 | Loebner |
| 5,162,783 A | 11/1992 | Moreno |
| 5,166,668 A | 11/1992 | Aoyagi |
| 5,175,030 A | 12/1992 | Lu et al. |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaeser |
| 5,414,413 A | 5/1995 | Tamaru et al. |
| 5,434,373 A | 7/1995 | Komaki |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,515,083 A | 5/1996 | Casebolt et al. |
| 5,525,764 A | 6/1996 | Junkins et al. |
| 5,526,422 A | 6/1996 | Keen |
| 5,539,514 A | 7/1996 | Shishido et al. |
| 5,543,591 A | 8/1996 | Gillespie et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,605,406 A | 2/1997 | Bowen |
| 5,608,550 A | 3/1997 | Epstein et al. |
| 5,672,852 A | 9/1997 | Fukuzaki et al. |
| 5,677,082 A | 10/1997 | Greinke et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,729,250 A | 3/1998 | Bishop et al. |
| 5,736,686 A | 4/1998 | Perret et al. |
| 5,740,224 A | 4/1998 | Mueller et al. |
| 5,746,423 A | 5/1998 | Arov |
| 5,764,223 A | 6/1998 | Chang et al. |
| 5,767,517 A | 6/1998 | Hawkins |
| 5,775,792 A | 7/1998 | Wiese |
| 5,808,606 A | 9/1998 | Kodama et al. |
| 5,945,980 A | 8/1999 | Moissev et al. |
| 5,945,981 A | 8/1999 | Paull et al. |
| 5,959,617 A | 9/1999 | Bird et al. |
| 6,031,524 A | 2/2000 | Kunert |
| 6,061,177 A | 5/2000 | Fujimoto |
| 6,067,079 A | 5/2000 | Shieh |
| 6,072,450 A | 6/2000 | Yamada et al. |
| 6,100,538 A | 8/2000 | Ogawa |
| 6,122,394 A | 9/2000 | Neukermans et al. |
| 6,130,663 A | 10/2000 | Null |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,315,156 B1 | 11/2001 | Mahoney et al. |
| 6,333,735 B1 | 12/2001 | Anvekar |
| 6,340,967 B1 | 1/2002 | Maxted |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,480,187 B1 | 11/2002 | Sano et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,504,530 B1 | 1/2003 | Wilson et al. |
| 6,524,749 B1 | 2/2003 | Kaneda et al. |
| 6,529,327 B1 | 3/2003 | Graindorge |
| 6,535,213 B1 | 3/2003 | Ogino et al. |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,677,934 B1 | 1/2004 | Blanchard |
| 6,690,363 B2 | 2/2004 | Newton |
| 6,692,807 B2 | 2/2004 | Bries et al. |
| 6,707,027 B2 | 3/2004 | Liess et al. |
| 6,710,767 B1 | 3/2004 | Hasegawa et al. |

(56) References Cited

U.S. PATENT DOCUMENTS

| | | |
|---|---|---|
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,803,900 B1 | 10/2004 | Berkoff et al. |
| 6,806,871 B1 | 10/2004 | Yasue |
| 6,828,959 B2 | 12/2004 | Takekawa et al. |
| 6,911,646 B1 | 6/2005 | Weitekamp |
| 6,927,384 B2 | 8/2005 | Reime et al. |
| 6,940,286 B2 | 9/2005 | Wang et al. |
| 6,965,836 B2 | 11/2005 | Richardson |
| 6,972,401 B2 | 12/2005 | Akitt et al. |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,117,157 B1 | 10/2006 | Taylor et al. |
| 7,133,031 B2 | 11/2006 | Wang et al. |
| 7,151,530 B2 | 12/2006 | Roeber et al. |
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| D602,498 S | 10/2009 | Arnell |
| 7,613,375 B2 | 11/2009 | Shimizu |
| 7,629,968 B2 | 12/2009 | Miller et al. |
| 7,646,379 B1 | 1/2010 | Drennan et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,712,041 B2 | 5/2010 | Toyama et al. |
| 7,729,056 B2 | 6/2010 | Hwang et al. |
| 7,812,826 B2 | 10/2010 | Ording et al. |
| 7,847,789 B2 | 12/2010 | Kolmykov-Zotov et al. |
| 7,855,716 B2 | 12/2010 | Mccreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,956,847 B2 | 6/2011 | Christie |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu et al. |
| 8,139,046 B2 | 3/2012 | Kweon et al. |
| 8,149,211 B2 | 4/2012 | Hayakawa et al. |
| 8,149,221 B2 | 4/2012 | Newton |
| 8,154,418 B2 | 4/2012 | Peterson et al. |
| 8,184,108 B2 | 5/2012 | Smits |
| 8,194,036 B1 | 6/2012 | Braun et al. |
| 8,217,854 B2 | 7/2012 | Bhogal et al. |
| 8,218,154 B2 | 7/2012 | Oestergaard et al. |
| 8,274,495 B2 | 9/2012 | Lee |
| D669,497 S | 10/2012 | Lee et al. |
| 8,314,773 B2 | 11/2012 | Low et al. |
| 8,319,729 B2 | 11/2012 | Choi et al. |
| 8,325,158 B2 | 12/2012 | Yatsuda et al. |
| 8,339,379 B2 | 12/2012 | Goertz et al. |
| 8,345,023 B1 | 1/2013 | Drennan et al. |
| 8,350,827 B2 | 1/2013 | Chung et al. |
| D675,644 S | 2/2013 | Frost et al. |
| 8,384,010 B2 | 2/2013 | Hong et al. |
| 8,384,693 B2 | 2/2013 | Newton |
| 8,407,606 B1 | 3/2013 | Davidson et al. |
| 8,436,833 B2 | 5/2013 | King et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Christiansson et al. |
| 8,542,217 B2 | 9/2013 | Wassvik et al. |
| 8,553,014 B2 | 10/2013 | Holmgren et al. |
| 8,567,257 B2 | 10/2013 | Van et al. |
| 8,571,171 B2 | 10/2013 | Tischenko et al. |
| 8,581,884 B2 | 11/2013 | Fåhraeus et al. |
| 8,587,562 B2 | 11/2013 | Goertz et al. |
| 8,599,140 B2 | 12/2013 | Crockett et al. |
| 8,610,672 B2 | 12/2013 | Kun et al. |
| 8,624,858 B2 | 1/2014 | Fyke et al. |
| 8,674,963 B2 | 3/2014 | Cornish et al. |
| 8,676,007 B2 | 3/2014 | Holmgren et al. |
| 8,686,974 B2 | 4/2014 | Christiansson et al. |
| 8,692,807 B2 | 4/2014 | Foehraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,749,527 B2 | 6/2014 | Douxchamps et al. |
| 8,780,066 B2 | 7/2014 | Christiansson et al. |
| 8,830,181 B1 | 9/2014 | Clark et al. |
| 8,837,882 B2 | 9/2014 | Holmgren et al. |
| 8,860,696 B2 | 10/2014 | Wassvik et al. |
| 8,866,870 B1 | 10/2014 | Smith |
| 8,872,098 B2 | 10/2014 | Bergstrm et al. |
| 8,872,801 B2 | 10/2014 | Bergstrm et al. |
| D716,820 S | 11/2014 | Wood |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,896,575 B2 | 11/2014 | Goertz et al. |
| 8,902,196 B2 | 12/2014 | Goertz et al. |
| 8,913,035 B2 | 12/2014 | Lai et al. |
| 8,922,526 B2 | 12/2014 | Wang |
| 8,928,590 B1 | 1/2015 | El Dokor |
| 8,928,609 B2 | 1/2015 | Italia et al. |
| 8,963,886 B2 | 2/2015 | Wassvik |
| 8,982,084 B2 | 3/2015 | Christiansson et al. |
| 9,001,086 B1 | 4/2015 | Saini |
| 9,024,896 B2 | 5/2015 | Chen |
| 9,024,916 B2 | 5/2015 | Christiansson |
| 9,025,855 B1 | 5/2015 | Christoph et al. |
| 9,035,909 B2 | 5/2015 | Christiansson |
| 9,052,771 B2 | 6/2015 | Goertz et al. |
| 9,063,614 B2 | 6/2015 | Pettersson et al. |
| 9,063,617 B2 | 6/2015 | Eliasson et al. |
| 9,086,763 B2 | 7/2015 | Johansson et al. |
| 9,092,091 B2 | 7/2015 | Piot et al. |
| 9,092,094 B1 | 7/2015 | Baldwin |
| 9,128,250 B2 | 9/2015 | Charters et al. |
| 9,134,854 B2 | 9/2015 | Wassvik et al. |
| 9,137,891 B2 | 9/2015 | Gibbs et al. |
| 9,158,401 B2 | 10/2015 | Christiansson et al. |
| 9,158,415 B2 | 10/2015 | Song et al. |
| 9,158,416 B2 | 10/2015 | Eriksson et al. |
| 9,164,625 B2 | 10/2015 | Holmgren et al. |
| 9,195,344 B2 | 11/2015 | Goertz et al. |
| 9,201,520 B2 | 12/2015 | Benko et al. |
| 9,207,800 B1 | 12/2015 | Eriksson et al. |
| 9,213,443 B2 | 12/2015 | Goertz et al. |
| 9,213,445 B2 | 12/2015 | King et al. |
| 9,223,441 B1 | 12/2015 | Bohn |
| 9,274,645 B2 | 3/2016 | Christiansson et al. |
| 9,280,237 B2 | 3/2016 | Kukulj |
| 9,291,845 B2 | 3/2016 | Shin et al. |
| 9,292,132 B2 | 3/2016 | An et al. |
| 9,317,146 B1 | 4/2016 | Hufnagel |
| 9,317,168 B2 | 4/2016 | Christiansson et al. |
| 9,318,156 B2 | 4/2016 | Kanapathippillai et al. |
| 9,323,396 B2 | 4/2016 | Han et al. |
| 9,335,867 B2 | 5/2016 | Holmgren et al. |
| 9,366,565 B2 | 6/2016 | Uvns |
| 9,366,802 B2 | 6/2016 | Lee et al. |
| 9,377,882 B2 | 6/2016 | Kim |
| 9,377,884 B2 | 6/2016 | Christiansson et al. |
| 9,389,730 B2 | 7/2016 | Goertz et al. |

(56) References Cited

U.S. PATENT DOCUMENTS

| | | |
|---|---|---|
| 9,389,732 B2 | 7/2016 | Craven-Bartle |
| 9,411,430 B2 | 8/2016 | Holmgren et al. |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| D768,674 S | 10/2016 | Hanover |
| 9,471,170 B2 | 10/2016 | Goertz et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,563,298 B2 | 2/2017 | Sakashita et al. |
| D782,516 S | 3/2017 | Höhne et al. |
| 9,588,619 B2 | 3/2017 | Christiansson et al. |
| 9,594,467 B2 | 3/2017 | Christiansson et al. |
| D783,042 S | 4/2017 | Kim et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,645,679 B2 | 5/2017 | Eriksson et al. |
| 9,652,082 B1 | 5/2017 | Lin et al. |
| 9,671,900 B2 | 6/2017 | Piot et al. |
| 9,678,601 B2 | 6/2017 | Pettersson et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,720,499 B2 | 8/2017 | Han et al. |
| 9,741,184 B2 | 8/2017 | Iyer et al. |
| D798,893 S | 10/2017 | Anzures et al. |
| 9,785,287 B2 | 10/2017 | Bergstrom et al. |
| 9,811,163 B2 | 11/2017 | Eriksson et al. |
| 9,811,209 B2 | 11/2017 | Christiansson et al. |
| 9,817,510 B2 | 11/2017 | Kim |
| D807,388 S | 1/2018 | Butcher et al. |
| D808,416 S | 1/2018 | Anzures et al. |
| 9,857,916 B2 | 1/2018 | Bergström et al. |
| 9,857,917 B2 | 1/2018 | Wassvik et al. |
| 9,864,470 B2 | 1/2018 | Christiansson |
| 9,874,978 B2 | 1/2018 | Wall |
| 9,921,661 B2 | 3/2018 | Eriksson et al. |
| 9,927,921 B2 | 3/2018 | Lee |
| 9,983,626 B2 | 5/2018 | Cao et al. |
| 9,983,717 B2 | 5/2018 | Pacheco et al. |
| 9,996,196 B2 | 6/2018 | Christiansson et al. |
| 10,001,881 B2 | 6/2018 | Wallander et al. |
| 10,004,985 B2 | 6/2018 | Holmgren et al. |
| D824,412 S | 7/2018 | Anzures et al. |
| 10,013,107 B2 | 7/2018 | Christiansson et al. |
| 10,019,113 B2 | 7/2018 | Christiansson et al. |
| 10,024,741 B2 | 7/2018 | Povazay et al. |
| 10,031,623 B2 | 7/2018 | Christiansson et al. |
| 10,048,773 B2 | 8/2018 | Fahraeus et al. |
| 10,088,919 B2 | 10/2018 | Tamura |
| 10,088,957 B2 | 10/2018 | Johansson et al. |
| 10,126,882 B2 | 11/2018 | Wassvik |
| 10,126,897 B2 | 11/2018 | Kwon et al. |
| 10,139,854 B2 | 11/2018 | Krishnakumar et al. |
| 10,146,376 B2 | 12/2018 | Wassvik et al. |
| 10,151,866 B2 | 12/2018 | Craven-Bartle et al. |
| 10,152,176 B2 | 12/2018 | Wallander |
| 10,161,886 B2 | 12/2018 | Ohlsson et al. |
| D837,829 S | 1/2019 | Balles et al. |
| D838,280 S | 1/2019 | Coburn et al. |
| 10,168,835 B2 | 1/2019 | Wallander et al. |
| D842,312 S | 3/2019 | Na et al. |
| 10,261,639 B2 | 4/2019 | Lee et al. |
| 10,268,288 B1 | 4/2019 | Wang et al. |
| 10,268,319 B2 | 4/2019 | Wassvik et al. |
| 10,282,035 B2 | 5/2019 | Kocovski et al. |
| 10,317,200 B1 | 6/2019 | Han et al. |
| 10,318,041 B2 | 6/2019 | Björklund et al. |
| 10,318,074 B2 | 6/2019 | Klinghult et al. |
| 10,324,565 B2 | 6/2019 | Rosengren et al. |
| 10,324,566 B2 | 6/2019 | Christiansson |
| D852,842 S | 7/2019 | Hung et al. |
| 10,365,768 B2 | 7/2019 | Craven-Bartle et al. |
| 10,372,265 B2 | 8/2019 | Christiansson et al. |
| 10,397,638 B2 | 8/2019 | Kanematsu et al. |
| 10,401,546 B2 | 9/2019 | Craven-Bartle et al. |
| 10,417,219 B1 | 9/2019 | Yang et al. |
| 10,437,358 B2 | 10/2019 | Geaghan et al. |
| 10,437,389 B2 | 10/2019 | Skagmo et al. |
| 10,459,589 B2 | 10/2019 | Xu et al. |
| 10,459,590 B2 | 10/2019 | Lin et al. |
| 10,474,249 B2 | 11/2019 | Fahraeus et al. |
| 10,481,737 B2 | 11/2019 | Christiansson et al. |
| 10,496,227 B2 | 12/2019 | Wassvik et al. |
| 10,579,227 B1 | 3/2020 | Bura et al. |
| 10,606,414 B2 | 3/2020 | Christiansson et al. |
| 10,606,416 B2 | 3/2020 | Skagmo et al. |
| 10,642,386 B2 | 5/2020 | Makelainen et al. |
| 10,649,585 B1 | 5/2020 | Van et al. |
| 10,691,638 B1 | 6/2020 | Lyadvinsky et al. |
| D892,855 S | 8/2020 | Liu |
| 10,739,916 B2 | 8/2020 | Skagmo et al. |
| 10,761,657 B2 | 9/2020 | Christiansson et al. |
| 10,775,935 B2 | 9/2020 | Kocovski et al. |
| 10,775,937 B2 | 9/2020 | Christiansson et al. |
| 10,845,923 B2 | 11/2020 | Skagmo et al. |
| 10,853,315 B1 | 12/2020 | Faibish et al. |
| 10,860,142 B1 | 12/2020 | Northcott et al. |
| 10,884,275 B2 | 1/2021 | Yang et al. |
| 10,884,553 B2 | 1/2021 | Weilbacher et al. |
| 10,892,303 B2 | 1/2021 | Li |
| 10,963,104 B2 | 3/2021 | Bergström et al. |
| 11,016,605 B2 | 5/2021 | Christiansson et al. |
| 11,029,783 B2 | 6/2021 | Wassvik et al. |
| 11,099,688 B2 | 8/2021 | Christiansson et al. |
| 11,106,312 B2 | 8/2021 | Christiansson et al. |
| 11,106,314 B2 | 8/2021 | Krishnakumar et al. |
| 11,119,565 B2 | 9/2021 | Avila et al. |
| 11,175,756 B2 | 11/2021 | Andersson et al. |
| 11,182,023 B2 | 11/2021 | Ohlsson et al. |
| 11,188,730 B1 | 11/2021 | Kwon et al. |
| 11,243,640 B2 | 2/2022 | Ancona et al. |
| 11,256,371 B2 | 2/2022 | Craven-Bartle et al. |
| 11,263,028 B2 | 3/2022 | Momchilov |
| 11,269,460 B2 | 3/2022 | Skagmo et al. |
| 11,281,335 B2 | 3/2022 | Kocovski et al. |
| 11,281,338 B2 | 3/2022 | Skagmo et al. |
| 11,301,089 B2 | 4/2022 | Christiansson et al. |
| 11,474,644 B2 | 10/2022 | Kocovski et al. |
| 11,567,610 B2 | 1/2023 | Bergström et al. |
| 11,579,731 B2 | 2/2023 | Kocovski et al. |
| 11,579,732 B2 | 2/2023 | Skagmo et al. |
| 11,650,699 B2 | 5/2023 | Bergström et al. |
| 11,740,741 B2 | 8/2023 | Bergström et al. |
| 11,868,568 B2 | 1/2024 | Kocovski et al. |
| 11,893,189 B2 | 2/2024 | Bergström |
| 11,909,033 B2 | 2/2024 | Tsuzuki et al. |
| 11,914,819 B2 | 2/2024 | Kocovski et al. |
| 11,943,563 B2 | 3/2024 | Wassvik et al. |
| 12,055,969 B2 | 8/2024 | Svensson et al. |
| 12,056,316 B2 | 8/2024 | Andersson et al. |
| 12,086,362 B2 | 9/2024 | Bergström et al. |
| 12,135,847 B2 | 11/2024 | Andreasson |
| 12,175,044 B2 | 12/2024 | Bergström et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2001/0055411 A1 | 12/2001 | Black |
| 2002/0067348 A1 | 6/2002 | Masters et al. |
| 2002/0075243 A1 | 6/2002 | Newton |
| 2002/0085003 A1 | 7/2002 | Nagashima |
| 2002/0118177 A1 | 8/2002 | Newton |
| 2002/0130883 A1 | 9/2002 | Huang et al. |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2002/0175901 A1 | 11/2002 | Gettemy |
| 2003/0016450 A1 | 1/2003 | Bluemel et al. |
| 2003/0034439 A1 | 2/2003 | Reime et al. |

(56) References Cited

U.S. PATENT DOCUMENTS

| | | |
|---|---|---|
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0085882 A1 | 5/2003 | Lu |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0109664 A1 | 6/2004 | Ohtsuki et al. |
| 2004/0130338 A1 | 7/2004 | Wang et al. |
| 2004/0134772 A1 | 7/2004 | Cohen et al. |
| 2004/0136564 A1 | 7/2004 | Roeber et al. |
| 2004/0174541 A1 | 9/2004 | Freifeld |
| 2004/0179001 A1 | 9/2004 | Morrison et al. |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0005319 A1 | 1/2005 | Della-Cioppa et al. |
| 2005/0012714 A1 | 1/2005 | Russo et al. |
| 2005/0022130 A1 | 1/2005 | Fabritius |
| 2005/0024624 A1 | 2/2005 | Gruhlke et al. |
| 2005/0041013 A1 | 2/2005 | Tanaka |
| 2005/0052635 A1 | 3/2005 | Xie et al. |
| 2005/0053191 A1 | 3/2005 | Gohno et al. |
| 2005/0057522 A1 | 3/2005 | Godler |
| 2005/0057903 A1 | 3/2005 | Choi |
| 2005/0073508 A1 | 4/2005 | Pittel et al. |
| 2005/0083293 A1 | 4/2005 | Dixon |
| 2005/0092900 A1 | 5/2005 | Reime et al. |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1 | 8/2005 | Nishikawa |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0237317 A1 | 10/2005 | Cok |
| 2005/0248540 A1 | 11/2005 | Newton |
| 2005/0248848 A1 | 11/2005 | Whitehead et al. |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0013353 A1 | 1/2006 | Hein |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0066586 A1 | 3/2006 | Gally et al. |
| 2006/0098004 A1 | 5/2006 | Cok |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0144237 A1 | 7/2006 | Liang et al. |
| 2006/0158437 A1 | 7/2006 | Blythe et al. |
| 2006/0161871 A1 | 7/2006 | Hotelling et al. |
| 2006/0164443 A1 | 7/2006 | Kettle et al. |
| 2006/0170658 A1 | 8/2006 | Nakamura et al. |
| 2006/0182345 A1 | 8/2006 | Geidl et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1 | 4/2007 | Leung et al. |
| 2007/0120833 A1 | 5/2007 | Yamaguchi et al. |
| 2007/0125937 A1 | 6/2007 | Eliasson et al. |
| 2007/0132710 A1 | 6/2007 | Tateuchi et al. |
| 2007/0146337 A1 | 6/2007 | Ording et al. |
| 2007/0152985 A1 | 7/2007 | Ostergaard et al. |
| 2007/0165008 A1 | 7/2007 | Crockett |
| 2007/0176162 A1 | 8/2007 | Kang |
| 2007/0195404 A1 | 8/2007 | Iijima |
| 2007/0201042 A1 | 8/2007 | Eliasson et al. |
| 2007/0285406 A1 | 12/2007 | Kukulj et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0012835 A1 | 1/2008 | Rimon et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0074402 A1 | 3/2008 | Cornish et al. |
| 2008/0080811 A1 | 4/2008 | Deane |
| 2008/0088603 A1 | 4/2008 | Eliasson et al. |
| 2008/0115081 A1 | 5/2008 | Sankaravadivelu et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Ren et al. |
| 2008/0133265 A1 | 6/2008 | Silkaitis et al. |
| 2008/0150846 A1 | 6/2008 | Chung |
| 2008/0150848 A1 | 6/2008 | Chung et al. |
| 2008/0150915 A1 | 6/2008 | Shibue et al. |
| 2008/0151126 A1 | 6/2008 | Yu |
| 2008/0158176 A1 | 7/2008 | Land et al. |
| 2008/0180404 A1 | 7/2008 | Han et al. |
| 2008/0189046 A1 | 8/2008 | Eliasson et al. |
| 2008/0192025 A1 | 8/2008 | Jaeger et al. |
| 2008/0198144 A1 | 8/2008 | Shimizu et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0280952 A1 | 11/2008 | Giblin et al. |
| 2008/0284925 A1 | 11/2008 | Han |
| 2008/0285406 A1 | 11/2008 | Moro et al. |
| 2008/0291668 A1 | 11/2008 | Aylward et al. |
| 2008/0297482 A1 | 12/2008 | Weiss |
| 2008/0309626 A1 | 12/2008 | Westerman et al. |
| 2009/0000831 A1 | 1/2009 | Miller et al. |
| 2009/0002340 A1 | 1/2009 | Van Genechten |
| 2009/0006292 A1 | 1/2009 | Block |
| 2009/0013562 A1 | 1/2009 | Pelletier |
| 2009/0040786 A1 | 2/2009 | Mori |
| 2009/0058832 A1 | 3/2009 | Newton |
| 2009/0058833 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0100383 A1 | 4/2009 | Sunday et al. |
| 2009/0115919 A1 | 5/2009 | Tanaka et al. |

(56) References Cited

U.S. PATENT DOCUMENTS

| | | |
|---|---|---|
| 2009/0122020 A1 | 5/2009 | Eliasson et al. |
| 2009/0122027 A1 | 5/2009 | Newton |
| 2009/0127005 A1 | 5/2009 | Zachut et al. |
| 2009/0128499 A1 | 5/2009 | Izadi et al. |
| 2009/0128508 A1 | 5/2009 | Sohn et al. |
| 2009/0135162 A1 | 5/2009 | Van et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0174679 A1 | 7/2009 | Westerman |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0209420 A1 | 8/2009 | Kalgutkar et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Oestergaard et al. |
| 2009/0273795 A1 | 11/2009 | Bacher et al. |
| 2009/0278795 A1 | 11/2009 | Hansen et al. |
| 2009/0278816 A1 | 11/2009 | Colson |
| 2009/0278913 A1 | 11/2009 | Rosenfeld et al. |
| 2009/0295752 A1 | 12/2009 | Liu et al. |
| 2009/0297009 A1 | 12/2009 | Xu et al. |
| 2010/0007331 A1 | 1/2010 | Hawkins et al. |
| 2010/0014024 A1 | 1/2010 | Tatsumi et al. |
| 2010/0026667 A1 | 2/2010 | Bernstein |
| 2010/0033444 A1 | 2/2010 | Kobayashi |
| 2010/0038545 A1 | 2/2010 | Cavallucci et al. |
| 2010/0045629 A1 | 2/2010 | Newton |
| 2010/0045634 A1 | 2/2010 | Su et al. |
| 2010/0057235 A1 | 3/2010 | Wang et al. |
| 2010/0059295 A1 | 3/2010 | Hotelling et al. |
| 2010/0060896 A1 | 3/2010 | Van et al. |
| 2010/0066016 A1 | 3/2010 | Van et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0128985 A1 | 5/2010 | El-Sana et al. |
| 2010/0130257 A1 | 5/2010 | Jang |
| 2010/0130280 A1 | 5/2010 | Arezina et al. |
| 2010/0134435 A1 | 6/2010 | Kimura et al. |
| 2010/0141604 A1 | 6/2010 | Cai et al. |
| 2010/0142823 A1 | 6/2010 | Wang et al. |
| 2010/0166276 A1 | 7/2010 | Dube et al. |
| 2010/0176732 A1 | 7/2010 | Schenk et al. |
| 2010/0187422 A1 | 7/2010 | Kothari et al. |
| 2010/0189376 A1 | 7/2010 | Bertram et al. |
| 2010/0193259 A1 | 8/2010 | Wassvik |
| 2010/0195804 A1 | 8/2010 | Dafni et al. |
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0238686 A1 | 9/2010 | Weber et al. |
| 2010/0245292 A1 | 9/2010 | Wu |
| 2010/0253645 A1 | 10/2010 | Bolender |
| 2010/0259939 A1 | 10/2010 | Chen et al. |
| 2010/0265170 A1 | 10/2010 | Norieda |
| 2010/0277431 A1 | 11/2010 | Klinghult |
| 2010/0277436 A1 | 11/2010 | Feng et al. |
| 2010/0277728 A1 | 11/2010 | Imura |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0309139 A1 | 12/2010 | Ng |
| 2010/0315379 A1 | 12/2010 | Allard et al. |
| 2010/0321328 A1 | 12/2010 | Chang et al. |
| 2010/0321341 A1 | 12/2010 | Cho et al. |
| 2010/0322550 A1 | 12/2010 | Trott |
| 2010/0325547 A1 | 12/2010 | Keng et al. |
| 2010/0328265 A1 | 12/2010 | Hotelling et al. |
| 2011/0007021 A1 | 1/2011 | Bernstein et al. |
| 2011/0037735 A1 | 2/2011 | Land et al. |
| 2011/0043490 A1 | 2/2011 | Powell et al. |
| 2011/0049388 A1 | 3/2011 | Delaney et al. |
| 2011/0050576 A1 | 3/2011 | Forutanpour et al. |
| 2011/0050649 A1 | 3/2011 | Newton et al. |
| 2011/0051394 A1 | 3/2011 | Bailey |
| 2011/0057102 A1 | 3/2011 | Yao |
| 2011/0065424 A1 | 3/2011 | Estevez et al. |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0096293 A1 | 4/2011 | Hirose et al. |
| 2011/0102320 A1 | 5/2011 | Hauke et al. |
| 2011/0102374 A1 | 5/2011 | Wassvik et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0140106 A1 | 6/2011 | Forbes |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169756 A1 | 7/2011 | Ogawa et al. |
| 2011/0169780 A1 | 7/2011 | Goertz et al. |
| 2011/0175852 A1 | 7/2011 | Goertz et al. |
| 2011/0181552 A1 | 7/2011 | Goertz et al. |
| 2011/0199297 A1 | 8/2011 | Antonyuk et al. |
| 2011/0205186 A1 | 8/2011 | Newton et al. |
| 2011/0205189 A1 | 8/2011 | Newton |
| 2011/0205750 A1 | 8/2011 | Krijn et al. |
| 2011/0210946 A1 | 9/2011 | Goertz et al. |
| 2011/0216042 A1 | 9/2011 | Wassvik et al. |
| 2011/0220794 A1 | 9/2011 | Censor et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0234537 A1 | 9/2011 | Kim et al. |
| 2011/0254864 A1 | 10/2011 | Tsuchikawa et al. |
| 2011/0255305 A1 | 10/2011 | Chen et al. |
| 2011/0260829 A1 | 10/2011 | Lee |
| 2011/0261020 A1 | 10/2011 | Song et al. |
| 2011/0266423 A1 | 11/2011 | Koeppe et al. |
| 2011/0267264 A1 | 11/2011 | Mccarthy et al. |
| 2011/0267296 A1 | 11/2011 | Noguchi et al. |
| 2011/0287317 A1 | 11/2011 | Nakanishi |
| 2011/0291944 A1 | 12/2011 | Simmons et al. |
| 2011/0291988 A1 | 12/2011 | Bamji et al. |
| 2011/0291989 A1 | 12/2011 | Lee |
| 2011/0298743 A1 | 12/2011 | Machida et al. |

(56) References Cited

U.S. PATENT DOCUMENTS

| | | |
|---|---|---|
| 2011/0304577 A1 | 12/2011 | Brown et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Chang et al. |
| 2012/0017182 A1 | 1/2012 | Bau |
| 2012/0019448 A1 | 1/2012 | Pitkanen et al. |
| 2012/0026408 A1 | 2/2012 | Lee et al. |
| 2012/0038593 A1 | 2/2012 | Roenkae et al. |
| 2012/0044572 A1 | 2/2012 | Simmonds et al. |
| 2012/0045170 A1 | 2/2012 | Shibata et al. |
| 2012/0050336 A1 | 3/2012 | Nave et al. |
| 2012/0056081 A1 | 3/2012 | Kozodoy |
| 2012/0056807 A1 | 3/2012 | Chapman et al. |
| 2012/0056814 A1 | 3/2012 | Sudo |
| 2012/0062474 A1 | 3/2012 | Weishaupt et al. |
| 2012/0062489 A1 | 3/2012 | Andersson et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0091912 A1 | 4/2012 | Brown Elliott |
| 2012/0096383 A1 | 4/2012 | Sakamoto et al. |
| 2012/0098733 A1 | 4/2012 | Masuda et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0146950 A1 | 6/2012 | Park et al. |
| 2012/0146957 A1 | 6/2012 | Dunagan |
| 2012/0153134 A1 | 6/2012 | Bergstroem et al. |
| 2012/0154338 A1 | 6/2012 | Bergstroem et al. |
| 2012/0154339 A1 | 6/2012 | Land et al. |
| 2012/0162142 A1 | 6/2012 | Christiansson et al. |
| 2012/0162144 A1 | 6/2012 | Faahraeus et al. |
| 2012/0169672 A1 | 7/2012 | Christiansson |
| 2012/0170056 A1 | 7/2012 | Jakobsen et al. |
| 2012/0173343 A1 | 7/2012 | Koning |
| 2012/0176343 A1 | 7/2012 | Holmgren et al. |
| 2012/0181419 A1 | 7/2012 | Momtahan |
| 2012/0182266 A1 | 7/2012 | Han |
| 2012/0188205 A1 | 7/2012 | Jansson et al. |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0206375 A1 | 8/2012 | Fyke et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1 | 8/2012 | Drumm |
| 2012/0221715 A1 | 8/2012 | Hamada |
| 2012/0223916 A1 | 9/2012 | Kukulj |
| 2012/0235892 A1 | 9/2012 | Narendra et al. |
| 2012/0235955 A1 | 9/2012 | Ng et al. |
| 2012/0242622 A1 | 9/2012 | Tseng et al. |
| 2012/0249477 A1 | 10/2012 | Popovich et al. |
| 2012/0249478 A1 | 10/2012 | Chang et al. |
| 2012/0249485 A1 | 10/2012 | Ye et al. |
| 2012/0256882 A1 | 10/2012 | Christiansson et al. |
| 2012/0257004 A1 | 10/2012 | Smith et al. |
| 2012/0262407 A1 | 10/2012 | Hinckley et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0274583 A1 | 11/2012 | Haggerty |
| 2012/0299852 A1 | 11/2012 | Hsu et al. |
| 2012/0305755 A1 | 12/2012 | Hong et al. |
| 2012/0313865 A1 | 12/2012 | Pearce |
| 2013/0002536 A1 | 1/2013 | Yoshida et al. |
| 2013/0007579 A1 | 1/2013 | Dancy et al. |
| 2013/0016059 A1 | 1/2013 | Lowles et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0050141 A1 | 2/2013 | Park et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1 | 4/2013 | Tan et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120274 A1 | 5/2013 | Ha et al. |
| 2013/0120320 A1 | 5/2013 | Liu et al. |
| 2013/0120324 A1 | 5/2013 | Diverdi et al. |
| 2013/0125016 A1 | 5/2013 | Pallakoff et al. |
| 2013/0127765 A1 | 5/2013 | Behdasht et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0136304 A1 | 5/2013 | Anabuki et al. |
| 2013/0141388 A1 | 6/2013 | Ludwig et al. |
| 2013/0141395 A1 | 6/2013 | Holmgren et al. |
| 2013/0141397 A1 | 6/2013 | Dunagan |
| 2013/0155027 A1 | 6/2013 | Holmgren et al. |
| 2013/0155655 A1 | 6/2013 | Lee et al. |
| 2013/0155723 A1* | 6/2013 | Coleman ............... G02B 6/0028 362/621 |
| 2013/0158504 A1 | 6/2013 | Ruchti et al. |
| 2013/0162588 A1 | 6/2013 | Wen |
| 2013/0181896 A1 | 7/2013 | Gruhlke et al. |
| 2013/0181908 A1 | 7/2013 | Santiago et al. |
| 2013/0181953 A1 | 7/2013 | Hinckley et al. |
| 2013/0187891 A1 | 7/2013 | Eriksson et al. |
| 2013/0187957 A1 | 7/2013 | Andersson et al. |
| 2013/0201142 A1 | 8/2013 | Suarez Rovere |
| 2013/0205963 A1 | 8/2013 | Prochello et al. |
| 2013/0208506 A1 | 8/2013 | Ye et al. |
| 2013/0222344 A1 | 8/2013 | Lu et al. |
| 2013/0222346 A1 | 8/2013 | Chen et al. |
| 2013/0229357 A1 | 9/2013 | Powell et al. |
| 2013/0234991 A1 | 9/2013 | Sparf |
| 2013/0241886 A1 | 9/2013 | Eriksson et al. |
| 2013/0241887 A1 | 9/2013 | Sharma |
| 2013/0249833 A1 | 9/2013 | Christiansson et al. |
| 2013/0250354 A1 | 9/2013 | Kato et al. |
| 2013/0254314 A1 | 9/2013 | Chow |
| 2013/0257793 A1 | 10/2013 | Zeliff et al. |
| 2013/0257810 A1 | 10/2013 | Niu et al. |
| 2013/0263042 A1 | 10/2013 | Buening |
| 2013/0263240 A1 | 10/2013 | Moskovitch |
| 2013/0269867 A1 | 10/2013 | Trott |
| 2013/0271487 A1 | 10/2013 | Lincoln |
| 2013/0275082 A1 | 10/2013 | Follmer et al. |
| 2013/0279190 A1 | 10/2013 | Huang |
| 2013/0285920 A1 | 10/2013 | Colley |
| 2013/0285968 A1 | 10/2013 | Christiansson et al. |
| 2013/0285977 A1 | 10/2013 | Baharav et al. |
| 2013/0300714 A1 | 11/2013 | Goh et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0328790 A1 | 12/2013 | Liu et al. |
| 2013/0342490 A1 | 12/2013 | Wallander et al. |
| 2014/0002400 A1 | 1/2014 | Christiansson et al. |
| 2014/0009430 A1 | 1/2014 | Italia et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1 | 1/2014 | Kapoor |
| 2014/0035836 A1 | 2/2014 | Cui et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0104190 A1 | 4/2014 | Davidson |

(56) References Cited

U.S. PATENT DOCUMENTS

| | | |
|---|---|---|
| 2014/0104195 A1 | 4/2014 | Davidson |
| 2014/0109219 A1 | 4/2014 | Rohrweck et al. |
| 2014/0111416 A1 | 4/2014 | Sugiura |
| 2014/0111478 A1 | 4/2014 | Lin et al. |
| 2014/0111480 A1 | 4/2014 | Kim et al. |
| 2014/0118295 A1 | 5/2014 | Motoi |
| 2014/0139467 A1 | 5/2014 | Ghosh et al. |
| 2014/0149880 A1 | 5/2014 | Farouki |
| 2014/0152624 A1* | 6/2014 | Piot .................. G06F 3/0421 345/175 |
| 2014/0160762 A1 | 6/2014 | Dudik et al. |
| 2014/0168153 A1 | 6/2014 | Deichmann et al. |
| 2014/0192023 A1 | 7/2014 | Hoffman |
| 2014/0204036 A1 | 7/2014 | Schillings et al. |
| 2014/0210793 A1 | 7/2014 | Eriksson et al. |
| 2014/0218467 A1 | 8/2014 | You et al. |
| 2014/0225868 A1 | 8/2014 | Huang et al. |
| 2014/0226084 A1 | 8/2014 | Utukuri et al. |
| 2014/0226266 A1 | 8/2014 | Kang et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253514 A1 | 9/2014 | Omura et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267147 A1 | 9/2014 | Buelow et al. |
| 2014/0292690 A1 | 10/2014 | Sugihara |
| 2014/0292699 A1 | 10/2014 | Ando |
| 2014/0292701 A1 | 10/2014 | Christiansson et al. |
| 2014/0300572 A1 | 10/2014 | Ohlsson et al. |
| 2014/0320459 A1 | 10/2014 | Pettersson et al. |
| 2014/0324953 A1 | 10/2014 | Seo et al. |
| 2014/0334767 A1 | 11/2014 | Lim et al. |
| 2014/0362046 A1 | 12/2014 | Yoshida |
| 2014/0362053 A1 | 12/2014 | Holmgren et al. |
| 2014/0362404 A1 | 12/2014 | Miyasaka |
| 2014/0367873 A1 | 12/2014 | Yang et al. |
| 2014/0375607 A1 | 12/2014 | Christiansson et al. |
| 2014/0380193 A1 | 12/2014 | Coplen et al. |
| 2015/0002386 A1 | 1/2015 | Mankowski et al. |
| 2015/0002470 A1 | 1/2015 | Zhu et al. |
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0053850 A1 | 2/2015 | Uvns |
| 2015/0054759 A1 | 2/2015 | Christiansson et al. |
| 2015/0054791 A1 | 2/2015 | Omura |
| 2015/0062021 A1 | 3/2015 | Skaljak et al. |
| 2015/0062085 A1 | 3/2015 | Lu et al. |
| 2015/0070327 A1 | 3/2015 | Hsieh et al. |
| 2015/0083891 A1 | 3/2015 | Wallander |
| 2015/0091832 A1 | 4/2015 | Mizunuma et al. |
| 2015/0092233 A1 | 4/2015 | Park et al. |
| 2015/0103013 A9 | 4/2015 | Huang |
| 2015/0103051 A1 | 4/2015 | Wyrwas et al. |
| 2015/0109403 A1 | 4/2015 | Krishnan et al. |
| 2015/0121691 A1 | 5/2015 | Wang |
| 2015/0131010 A1 | 5/2015 | Sugiyama |
| 2015/0138105 A1 | 5/2015 | Christiansson et al. |
| 2015/0138161 A1 | 5/2015 | Wassvik |
| 2015/0154291 A1 | 6/2015 | Shepherd et al. |
| 2015/0160851 A1 | 6/2015 | Michihata et al. |
| 2015/0169948 A1 | 6/2015 | Motoi |
| 2015/0193141 A1 | 7/2015 | Goldsmith et al. |
| 2015/0193585 A1 | 7/2015 | Sunna |
| 2015/0194668 A1 | 7/2015 | Ueda et al. |
| 2015/0199071 A1 | 7/2015 | Hou |
| 2015/0205439 A1 | 7/2015 | Xu et al. |
| 2015/0205441 A1 | 7/2015 | Bergstrm et al. |
| 2015/0212607 A1 | 7/2015 | Miller et al. |
| 2015/0215450 A1 | 7/2015 | Seo et al. |
| 2015/0227261 A1 | 8/2015 | Huang et al. |
| 2015/0242055 A1 | 8/2015 | Wallander |
| 2015/0253568 A1 | 9/2015 | Kobayashi |
| 2015/0256658 A1 | 9/2015 | Shin et al. |
| 2015/0261323 A1 | 9/2015 | Cui et al. |
| 2015/0261375 A1 | 9/2015 | Leigh et al. |
| 2015/0271481 A1 | 9/2015 | Guthrie et al. |
| 2015/0277636 A1 | 10/2015 | Holmgren et al. |
| 2015/0277663 A1 | 10/2015 | Goertz et al. |
| 2015/0286698 A1 | 10/2015 | Gagnier et al. |
| 2015/0286810 A1 | 10/2015 | Lebert |
| 2015/0288327 A1 | 10/2015 | Cherukupalli et al. |
| 2015/0293600 A1 | 10/2015 | Sears |
| 2015/0302026 A1 | 10/2015 | Nam et al. |
| 2015/0309662 A1 | 10/2015 | Wyrwas et al. |
| 2015/0309765 A1 | 10/2015 | Nagahara |
| 2015/0324028 A1 | 11/2015 | Wassvik et al. |
| 2015/0325848 A1 | 11/2015 | Yamashita et al. |
| 2015/0331461 A1 | 11/2015 | Delano et al. |
| 2015/0331544 A1 | 11/2015 | Bergstrom et al. |
| 2015/0331545 A1 | 11/2015 | Wassvik et al. |
| 2015/0332655 A1 | 11/2015 | Krus et al. |
| 2015/0334138 A1 | 11/2015 | Conklin et al. |
| 2015/0334139 A1 | 11/2015 | Conklin et al. |
| 2015/0339000 A1 | 11/2015 | Lee et al. |
| 2015/0346856 A1 | 12/2015 | Wassvik |
| 2015/0363041 A1 | 12/2015 | Zeliff et al. |
| 2015/0363042 A1 | 12/2015 | Krus et al. |
| 2015/0373864 A1 | 12/2015 | Jung |
| 2016/0004898 A1 | 1/2016 | Holz |
| 2016/0021833 A1 | 1/2016 | Nishimura et al. |
| 2016/0026297 A1 | 1/2016 | Shinkai et al. |
| 2016/0026337 A1 | 1/2016 | Wassvik et al. |
| 2016/0034109 A1 | 2/2016 | Cho et al. |
| 2016/0041629 A1 | 2/2016 | Rao et al. |
| 2016/0050263 A1 | 2/2016 | Hwang et al. |
| 2016/0050746 A1 | 2/2016 | Wassvik et al. |
| 2016/0056471 A1 | 2/2016 | Sugimori et al. |
| 2016/0062549 A1 | 3/2016 | Drumm et al. |
| 2016/0065633 A1 | 3/2016 | Kawakubo |
| 2016/0070416 A1 | 3/2016 | Wassvik |
| 2016/0077616 A1 | 3/2016 | Durojaiye et al. |
| 2016/0092021 A1 | 3/2016 | Tu et al. |
| 2016/0098148 A1 | 4/2016 | Gandra et al. |
| 2016/0098152 A1 | 4/2016 | Drumm et al. |
| 2016/0103026 A1 | 4/2016 | Povazay et al. |
| 2016/0117019 A1 | 4/2016 | Takeda |
| 2016/0124546 A1 | 5/2016 | Chen et al. |
| 2016/0124551 A1 | 5/2016 | Christiansson et al. |
| 2016/0147375 A1 | 5/2016 | Bok et al. |
| 2016/0154532 A1 | 6/2016 | Campbell |
| 2016/0154533 A1 | 6/2016 | Eriksson et al. |
| 2016/0179261 A1 | 6/2016 | Drumm |
| 2016/0195975 A1 | 7/2016 | Baum et al. |
| 2016/0202801 A1 | 7/2016 | Odagiri et al. |
| 2016/0202841 A1 | 7/2016 | Christiansson et al. |
| 2016/0209886 A1 | 7/2016 | Suh et al. |
| 2016/0210306 A1 | 7/2016 | Kumarasamy et al. |
| 2016/0216844 A1 | 7/2016 | Bergström |
| 2016/0227381 A1 | 8/2016 | Bargetzi et al. |
| 2016/0231833 A1 | 8/2016 | Gu et al. |
| 2016/0239153 A1 | 8/2016 | Holmgren et al. |
| 2016/0246390 A1 | 8/2016 | Lukanc et al. |
| 2016/0253568 A1 | 9/2016 | Idzik et al. |
| 2016/0255713 A1 | 9/2016 | Kim et al. |
| 2016/0269329 A1 | 9/2016 | Willis |
| 2016/0295711 A1 | 10/2016 | Ryu et al. |
| 2016/0299583 A1 | 10/2016 | Watanabe |
| 2016/0306501 A1 | 10/2016 | Drumm et al. |
| 2016/0328090 A1 | 11/2016 | Klinghult |
| 2016/0342282 A1 | 11/2016 | Wassvik |
| 2017/0031516 A1 | 2/2017 | Sugiyama et al. |
| 2017/0075476 A1 | 3/2017 | Kwon et al. |
| 2017/0075484 A1 | 3/2017 | Kali et al. |
| 2017/0075494 A1 | 3/2017 | Kwon et al. |
| 2017/0083164 A1 | 3/2017 | Sheng et al. |
| 2017/0090598 A1 | 3/2017 | Morrison et al. |
| 2017/0094224 A1 | 3/2017 | Hasegawa et al. |
| 2017/0115823 A1 | 4/2017 | Huang et al. |

(56) References Cited

U.S. PATENT DOCUMENTS

| | | |
|---|---|---|
| 2017/0123257 A1 | 5/2017 | Zhao |
| 2017/0131846 A1 | 5/2017 | Huitema |
| 2017/0147105 A1 | 5/2017 | Kwon et al. |
| 2017/0153763 A1 | 6/2017 | Vavra et al. |
| 2017/0160871 A1 | 6/2017 | Drumm |
| 2017/0185186 A1 | 6/2017 | Liu |
| 2017/0185230 A1 | 6/2017 | Wallander et al. |
| 2017/0185269 A1 | 6/2017 | Anttila et al. |
| 2017/0192493 A1 | 7/2017 | Ofek et al. |
| 2017/0192596 A1 | 7/2017 | Lee et al. |
| 2017/0205995 A1 | 7/2017 | Johansson |
| 2017/0220204 A1 | 8/2017 | Huang et al. |
| 2017/0235537 A1 | 8/2017 | Liu et al. |
| 2017/0237871 A1 | 8/2017 | Fan |
| 2017/0242579 A1 | 8/2017 | Poon et al. |
| 2017/0249030 A1 | 8/2017 | Park et al. |
| 2017/0255337 A1 | 9/2017 | Drumm |
| 2017/0264865 A1 | 9/2017 | Huangfu |
| 2017/0277355 A1 | 9/2017 | Kang |
| 2017/0285789 A1 | 10/2017 | Barel |
| 2017/0308236 A1 | 10/2017 | Lee |
| 2017/0318115 A1 | 11/2017 | Peng et al. |
| 2017/0336891 A1 | 11/2017 | Rosenberg et al. |
| 2018/0049014 A1 | 2/2018 | Patil et al. |
| 2018/0062158 A1 | 3/2018 | Kim et al. |
| 2018/0074654 A1 | 3/2018 | Tanaka et al. |
| 2018/0107373 A1 | 4/2018 | Cheng |
| 2018/0113569 A1 | 4/2018 | Pommier et al. |
| 2018/0129311 A1 | 5/2018 | Westhues et al. |
| 2018/0136787 A1 | 5/2018 | Echols et al. |
| 2018/0136788 A1 | 5/2018 | He et al. |
| 2018/0149792 A1 | 5/2018 | Lee et al. |
| 2018/0168153 A1 | 6/2018 | Chen et al. |
| 2018/0203557 A1 | 7/2018 | Kim |
| 2018/0204877 A1 | 7/2018 | Jalili et al. |
| 2018/0205989 A1 | 7/2018 | Srinivasan et al. |
| 2018/0225006 A1 | 8/2018 | Wall |
| 2018/0235017 A1 | 8/2018 | Sakamoto |
| 2018/0253187 A1 | 9/2018 | Christiansson et al. |
| 2018/0263130 A1 | 9/2018 | Curran et al. |
| 2018/0275830 A1 | 9/2018 | Christiansson et al. |
| 2018/0275836 A1 | 9/2018 | Hermans et al. |
| 2018/0279454 A1 | 9/2018 | Takeshita et al. |
| 2018/0293436 A1 | 10/2018 | Jeon et al. |
| 2018/0314206 A1 | 11/2018 | Lee et al. |
| 2018/0349014 A1 | 12/2018 | Samuel et al. |
| 2019/0004668 A1 | 1/2019 | Jeong et al. |
| 2019/0012027 A1 | 1/2019 | Park et al. |
| 2019/0025977 A1 | 1/2019 | Christiansson et al. |
| 2019/0025984 A1 | 1/2019 | Weilbacher et al. |
| 2019/0050074 A1 | 2/2019 | Kocovski |
| 2019/0065030 A1 | 2/2019 | Kang et al. |
| 2019/0079638 A1 | 3/2019 | Kocovski et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196660 A1 | 6/2019 | Skagmo et al. |
| 2019/0227670 A1 | 7/2019 | O'Cleirigh et al. |
| 2019/0235665 A1 | 8/2019 | Kim et al. |
| 2019/0235701 A1 | 8/2019 | Han et al. |
| 2019/0250755 A1 | 8/2019 | Liu et al. |
| 2019/0250769 A1 | 8/2019 | Wallander |
| 2019/0258353 A1 | 8/2019 | Drumm et al. |
| 2019/0265941 A1 | 8/2019 | Baba |
| 2019/0272052 A1 | 9/2019 | Wallander et al. |
| 2019/0324570 A1 | 10/2019 | Kolundzija et al. |
| 2019/0377431 A1 | 12/2019 | Drumm |
| 2019/0377435 A1 | 12/2019 | Piot et al. |
| 2020/0006761 A1 | 1/2020 | Fujino et al. |
| 2020/0012359 A1 | 1/2020 | Jakobson et al. |
| 2020/0012408 A1 | 1/2020 | Drumm et al. |
| 2020/0064937 A1 | 2/2020 | Wassvik et al. |
| 2020/0073509 A1 | 3/2020 | Shih et al. |
| 2020/0096854 A1 | 3/2020 | Schiavoni et al. |
| 2020/0098147 A1 | 3/2020 | Ha et al. |
| 2020/0125189 A1 | 4/2020 | Kim et al. |
| 2020/0159382 A1 | 5/2020 | Drumm |
| 2020/0167033 A1 | 5/2020 | Kim et al. |
| 2020/0173050 A1 | 6/2020 | Curran et al. |
| 2020/0174644 A1 | 6/2020 | Weibull et al. |
| 2020/0177742 A1 | 6/2020 | Homma et al. |
| 2020/0249777 A1 | 8/2020 | Hou et al. |
| 2020/0293136 A1 | 9/2020 | Jakobson et al. |
| 2020/0310621 A1 | 10/2020 | Piot et al. |
| 2020/0341587 A1 | 10/2020 | Drumm |
| 2020/0348473 A1 | 11/2020 | Drumm |
| 2020/0348817 A1 | 11/2020 | Ohlsson et al. |
| 2020/0387237 A1 | 12/2020 | Drumm |
| 2021/0026587 A1 | 1/2021 | Christiansson et al. |
| 2021/0041970 A1 | 2/2021 | Bergström et al. |
| 2021/0050086 A1 | 2/2021 | Rose et al. |
| 2021/0081071 A1 | 3/2021 | Koh et al. |
| 2021/0089164 A1 | 3/2021 | Christiansson et al. |
| 2021/0096604 A1 | 4/2021 | Curran et al. |
| 2022/0035481 A1 | 2/2022 | Bergström et al. |
| 2022/0100313 A1 | 3/2022 | Holmgren |
| 2022/0221955 A1 | 7/2022 | Bergström et al. |
| 2023/0057020 A1 | 2/2023 | Wassvik |
| 2023/0082401 A1 | 3/2023 | Andreasson et al. |
| 2023/0168775 A1 | 6/2023 | Skagmo et al. |
| 2023/0229266 A1 | 7/2023 | Bergstrom et al. |
| 2023/0393692 A1 | 12/2023 | Krus |
| 2023/0400948 A1 | 12/2023 | Bergström et al. |
| 2024/0111367 A1 | 4/2024 | Wassvik et al. |
| 2024/0248565 A1 | 7/2024 | Bergstrom et al. |
| 2024/0427460 A1 | 12/2024 | Andersson et al. |

FOREIGN PATENT DOCUMENTS

| | | |
|---|---|---|
| CA | 2745422 A1 | 6/2010 |
| CA | 2762681 A1 | 7/2012 |
| CN | 1794157 A | 6/2006 |
| CN | 101019071 A | 8/2007 |
| CN | 101075168 A | 11/2007 |
| CN | 101174191 A | 5/2008 |
| CN | 101206550 A | 6/2008 |
| CN | 201233592 Y | 5/2009 |
| CN | 101644854 A | 2/2010 |
| CN | 201437963 U | 4/2010 |
| CN | 201465071 U | 5/2010 |
| CN | 101882034 A | 11/2010 |
| CN | 102117155 A | 7/2011 |
| CN | 102929449 A | 2/2013 |
| CN | 202887145 U | 4/2013 |
| CN | 103123556 A | 5/2013 |
| CN | 203189466 U | 9/2013 |
| CN | 203224848 U | 10/2013 |
| CN | 203453994 U | 2/2014 |
| CN | 102414646 B | 4/2014 |
| CN | 203720812 U | 7/2014 |
| CN | 203786707 U | 8/2014 |
| CN | 203786708 U | 8/2014 |
| CN | 203825586 U | 9/2014 |
| CN | 104391611 A | 3/2015 |
| CN | 204288179 U | 4/2015 |
| CN | 104808843 A | 7/2015 |
| CN | 204695282 U | 10/2015 |
| CN | 105183241 A | 12/2015 |
| CN | 205015574 U | 2/2016 |
| CN | 205384833 U | 7/2016 |
| CN | 106648222 A | 5/2017 |
| CN | 206400503 U | 8/2017 |
| CN | 108345414 A | 7/2018 |
| CN | 105320382 B | 4/2021 |
| CN | 113010053 A | 6/2021 |
| DE | 3511330 A1 | 10/1986 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 10025175 A1 | 12/2001 |
| DE | 102009003990 A1 | 7/2010 |
| DE | 102010000473 A1 | 8/2010 |
| EP | 0600576 A1 | 6/1994 |

(56) References Cited

FOREIGN PATENT DOCUMENTS

| | | |
|---|---|---|
| EP | 0845812 A2 | 6/1998 |
| EP | 0897161 A1 | 2/1999 |
| EP | 0931731 A1 | 7/1999 |
| EP | 1126236 A1 | 8/2001 |
| EP | 1457870 A2 | 9/2004 |
| EP | 1471459 A2 | 10/2004 |
| EP | 1512989 A2 | 3/2005 |
| EP | 1798630 A2 | 6/2007 |
| EP | 1835464 A1 | 9/2007 |
| EP | 2077490 A2 | 7/2009 |
| EP | 2088501 A1 | 8/2009 |
| EP | 2314203 A1 | 4/2011 |
| EP | 2325735 A2 | 5/2011 |
| EP | 2339437 A2 | 6/2011 |
| EP | 0985206 B1 | 3/2012 |
| EP | 2442180 A1 | 4/2012 |
| EP | 2466428 A2 | 6/2012 |
| EP | 2466429 A1 | 6/2012 |
| EP | 2479642 A1 | 7/2012 |
| EP | 2515216 A1 | 10/2012 |
| EP | 2565770 A2 | 3/2013 |
| EP | 2765622 A2 | 8/2014 |
| EP | 2778849 A1 | 9/2014 |
| EP | 2797143 A1 | 10/2014 |
| EP | 2840470 A2 | 2/2015 |
| EP | 3002666 A1 | 4/2016 |
| EP | 3043242 A1 | 7/2016 |
| EP | 3535640 A1 | 9/2019 |
| EP | 3537269 A1 | 9/2019 |
| EP | 3644167 A1 | 4/2020 |
| FR | 2172828 A1 | 10/1973 |
| FR | 2617619 A1 | 1/1989 |
| FR | 2617620 A1 | 1/1989 |
| FR | 2614711 B1 | 3/1992 |
| FR | 2676275 A1 | 11/1992 |
| GB | 1380144 A | 1/1975 |
| GB | 2131544 A | 6/1984 |
| GB | 2204126 A | 11/1988 |
| GB | 2263765 A | 8/1993 |
| GB | 2472444 A | 2/2011 |
| JP | 62-159213 A | 7/1987 |
| JP | 05-190066 A | 7/1993 |
| JP | 11-085399 A | 3/1999 |
| JP | 2000-506655 A | 5/2000 |
| JP | 2000-172438 A | 6/2000 |
| JP | 2000-259334 A | 9/2000 |
| JP | 2000-268824 A | 9/2000 |
| JP | 2000-293311 A | 10/2000 |
| JP | 2003-330603 A | 11/2003 |
| JP | 2005-004278 A | 1/2005 |
| JP | 2008-506173 A | 2/2008 |
| JP | 2009-004139 A | 1/2009 |
| JP | 2009-543173 A | 12/2009 |
| JP | 2010-238426 A | 10/2010 |
| JP | 2011-530124 A | 12/2011 |
| JP | 2015-038862 A | 2/2015 |
| JP | 2015-049965 A | 3/2015 |
| JP | 2015-158831 A | 9/2015 |
| JP | 2016-192688 A | 11/2016 |
| JP | 6211595 B2 | 10/2017 |
| KR | 10-2001-0060254 A | 7/2001 |
| KR | 10-0359400 B1 | 10/2002 |
| KR | 10-0940435 B1 | 2/2010 |
| KR | 10-1081586 B1 | 11/2011 |
| KR | 10-1319543 B1 | 10/2013 |
| KR | 10-2015-0125374 A | 11/2015 |
| KR | 10-2016-0075643 A | 6/2016 |
| TW | M517370 U | 2/2016 |
| WO | 84/03186 A1 | 8/1984 |
| WO | 95/27919 A2 | 10/1995 |
| WO | 96/10148 A1 | 4/1996 |
| WO | 96/23649 A1 | 8/1996 |
| WO | 98/07127 A1 | 2/1998 |
| WO | 99/46602 A1 | 9/1999 |
| WO | 00/50807 A1 | 8/2000 |
| WO | 01/20781 A1 | 3/2001 |
| WO | 01/27867 A1 | 4/2001 |
| WO | 01/71654 A1 | 9/2001 |
| WO | 01/84251 A2 | 11/2001 |
| WO | 02/07072 A2 | 1/2002 |
| WO | 02/35460 A1 | 5/2002 |
| WO | 02/77915 A2 | 10/2002 |
| WO | 02/95668 A1 | 11/2002 |
| WO | 03/41006 A1 | 5/2003 |
| WO | 03/76870 A1 | 9/2003 |
| WO | 2004/032210 A2 | 4/2004 |
| WO | 2004/081502 A2 | 9/2004 |
| WO | 2004/081956 A2 | 9/2004 |
| WO | 2005/026938 A2 | 3/2005 |
| WO | 2005/029172 A2 | 3/2005 |
| WO | 2005/029395 A2 | 3/2005 |
| WO | 2005/125011 A1 | 12/2005 |
| WO | 2006/003245 A1 | 1/2006 |
| WO | 2006/081633 A1 | 8/2006 |
| WO | 2006/095320 A2 | 9/2006 |
| WO | 2006/124551 A2 | 11/2006 |
| WO | 2007/003196 A2 | 1/2007 |
| WO | 2007/047685 A2 | 4/2007 |
| WO | 2007/058924 A2 | 5/2007 |
| WO | 2007/112742 A1 | 10/2007 |
| WO | 2008/004097 A2 | 1/2008 |
| WO | 2008/004103 A2 | 1/2008 |
| WO | 2008/007276 A2 | 1/2008 |
| WO | 2008/007372 A2 | 1/2008 |
| WO | 2008/017077 A2 | 2/2008 |
| WO | 2008/032270 A2 | 3/2008 |
| WO | 2008/034184 A1 | 3/2008 |
| WO | 2008/038066 A2 | 4/2008 |
| WO | 2008/039006 A1 | 4/2008 |
| WO | 2008/044024 A2 | 4/2008 |
| WO | 2008/068607 A2 | 6/2008 |
| WO | 2009/000289 A1 | 12/2008 |
| WO | 2009/007704 A1 | 1/2009 |
| WO | 2009/029764 A1 | 3/2009 |
| WO | 2009/048365 A1 | 4/2009 |
| WO | 2009/077962 A2 | 6/2009 |
| WO | 2009/102681 A2 | 8/2009 |
| WO | 2009/135320 A1 | 11/2009 |
| WO | 2009/137355 A1 | 11/2009 |
| WO | 2010/006882 A2 | 1/2010 |
| WO | 2010/006883 A2 | 1/2010 |
| WO | 2010/006884 A2 | 1/2010 |
| WO | 2010/006885 A2 | 1/2010 |
| WO | 2010/006886 A2 | 1/2010 |
| WO | 2010/015408 A1 | 2/2010 |
| WO | 2010/015410 A2 | 2/2010 |
| WO | 2010/046539 A1 | 4/2010 |
| WO | 2010/056177 A1 | 5/2010 |
| WO | 2010/064983 A2 | 6/2010 |
| WO | 2010/081702 A2 | 7/2010 |
| WO | 2010/112404 A1 | 10/2010 |
| WO | 2010/123809 A2 | 10/2010 |
| WO | 2010/134865 A1 | 11/2010 |
| WO | 2011/028169 A1 | 3/2011 |
| WO | 2011/028170 A1 | 3/2011 |
| WO | 2011/031215 A1 | 3/2011 |
| WO | 2011/049511 A1 | 4/2011 |
| WO | 2011/049512 A1 | 4/2011 |
| WO | 2011/049513 A1 | 4/2011 |
| WO | 2011/057572 A1 | 5/2011 |
| WO | 2011/078769 A1 | 6/2011 |
| WO | 2011/082477 A1 | 7/2011 |
| WO | 2011/104673 A1 | 9/2011 |
| WO | 2011/119483 A1 | 9/2011 |
| WO | 2011/139213 A1 | 11/2011 |
| WO | 2012/002894 A1 | 1/2012 |
| WO | 2012/005051 A1 | 1/2012 |
| WO | 2012/010078 A1 | 1/2012 |
| WO | 2012/012165 A1 | 1/2012 |
| WO | 2012/015810 A2 | 2/2012 |
| WO | 2012/018176 A2 | 2/2012 |
| WO | 2012/050510 A1 | 4/2012 |
| WO | 2012/082055 A1 | 6/2012 |
| WO | 2012/105893 A1 | 8/2012 |

(56) References Cited

FOREIGN PATENT DOCUMENTS

| | | |
|---|---|---|
| WO | 2012/121652 A1 | 9/2012 |
| WO | 2012/158105 A2 | 11/2012 |
| WO | 2012/171181 A1 | 12/2012 |
| WO | 2012/172302 A1 | 12/2012 |
| WO | 2012/176801 A1 | 12/2012 |
| WO | 2013/011571 A1 | 1/2013 |
| WO | 2013/014534 A2 | 1/2013 |
| WO | 2013/036192 A1 | 3/2013 |
| WO | 2013/048312 A2 | 4/2013 |
| WO | 2013/055282 A2 | 4/2013 |
| WO | 2013/062471 A2 | 5/2013 |
| WO | 2013/081818 A1 | 6/2013 |
| WO | 2013/089622 A2 | 6/2013 |
| WO | 2013/108031 A2 | 7/2013 |
| WO | 2013/126005 A2 | 8/2013 |
| WO | 2013/133756 A1 | 9/2013 |
| WO | 2013/133757 A2 | 9/2013 |
| WO | 2013/138003 A1 | 9/2013 |
| WO | 2013/095271 A3 | 10/2013 |
| WO | 2013/115710 A3 | 10/2013 |
| WO | 2013/159472 A1 | 10/2013 |
| WO | 2013/165305 A2 | 11/2013 |
| WO | 2013/165306 A2 | 11/2013 |
| WO | 2013/176613 A2 | 11/2013 |
| WO | 2013/176614 A2 | 11/2013 |
| WO | 2013/176615 A2 | 11/2013 |
| WO | 2013/191638 A1 | 12/2013 |
| WO | 2014/016685 A1 | 1/2014 |
| WO | 2014/017973 A1 | 1/2014 |
| WO | 2014/027241 A2 | 2/2014 |
| WO | 2014/037963 A1 | 3/2014 |
| WO | 2014/044181 A1 | 3/2014 |
| WO | 2014/055809 A1 | 4/2014 |
| WO | 2014/042576 A3 | 5/2014 |
| WO | 2014/065601 A1 | 5/2014 |
| WO | 2014/086084 A1 | 6/2014 |
| WO | 2014/093937 A1 | 6/2014 |
| WO | 2014/098740 A1 | 6/2014 |
| WO | 2014/098741 A1 | 6/2014 |
| WO | 2014/098742 A1 | 6/2014 |
| WO | 2014/098743 A1 | 6/2014 |
| WO | 2014/098744 A1 | 6/2014 |
| WO | 2014/104967 A1 | 7/2014 |
| WO | 2014/130515 A1 | 8/2014 |
| WO | 2014/131221 A1 | 9/2014 |
| WO | 2014/168567 A1 | 10/2014 |
| WO | 2014/168568 A1 | 10/2014 |
| WO | 2014/168569 A1 | 10/2014 |
| WO | 2015/005847 A1 | 1/2015 |
| WO | 2015/029350 A1 | 3/2015 |
| WO | 2015/076731 A1 | 5/2015 |
| WO | 2015/084644 A1 | 6/2015 |
| WO | 2015/108477 A1 | 7/2015 |
| WO | 2015/108479 A1 | 7/2015 |
| WO | 2015/108480 A1 | 7/2015 |
| WO | 2015/123322 A1 | 8/2015 |
| WO | 2015/108478 A3 | 11/2015 |
| WO | 2015/175586 A1 | 11/2015 |
| WO | 2015/199602 A1 | 12/2015 |
| WO | 2016/122385 A1 | 8/2016 |
| WO | 2016/130074 A1 | 8/2016 |
| WO | 2016/140612 A1 | 9/2016 |
| WO | 2016/160745 A1 | 10/2016 |
| WO | 2016/177592 A1 | 11/2016 |
| WO | 2017/026821 A1 | 2/2017 |
| WO | 2017/099657 A1 | 6/2017 |
| WO | 2017/138863 A1 | 8/2017 |
| WO | 2018/003929 A1 | 1/2018 |
| WO | 2018/096430 A1 | 5/2018 |
| WO | 2018/106172 A1 | 6/2018 |
| WO | 2018/106176 A1 | 6/2018 |
| WO | 2018/141948 A1 | 8/2018 |
| WO | 2018/147782 A1 | 8/2018 |
| WO | 2018/182476 A1 | 10/2018 |
| WO | 2019/039984 A1 | 2/2019 |
| WO | 2019/045629 A1 | 3/2019 |
| WO | 2019/050459 A1 | 3/2019 |
| WO | 2019/156609 A1 | 8/2019 |
| WO | 2019/172826 A1 | 9/2019 |
| WO | 2019/172827 A1 | 9/2019 |
| WO | 2019/172829 A1 | 9/2019 |
| WO | 2019/177515 A1 | 9/2019 |
| WO | 2019/187537 A1 | 10/2019 |
| WO | 2020/022096 A1 | 1/2020 |
| WO | 2020/078339 A1 | 4/2020 |
| WO | 2020/078749 A1 | 4/2020 |
| WO | 2020/080992 A1 | 4/2020 |
| WO | 2020/153890 A1 | 7/2020 |
| WO | 2020/168802 A1 | 8/2020 |
| WO | 2020/236072 A1 | 11/2020 |
| WO | 2021/107840 A1 | 6/2021 |
| WO | 2021/112754 A1 | 6/2021 |
| WO | 2021/158164 A1 | 8/2021 |
| WO | 2021/158167 A1 | 8/2021 |
| WO | 2021/162602 A1 | 8/2021 |
| WO | 2022/086396 A1 | 4/2022 |
| WO | 2022/108508 A1 | 5/2022 |
| WO | 2022/173353 A1 | 8/2022 |

OTHER PUBLICATIONS

International Preliminary Report on Patentability received for PCT Patent Application No. PCT/SE2019/050195, mailed on Oct. 1, 2020, 10 pages.
International Preliminary Report on Patentability received for PCT Patent Application No. PCT/SE2019/050953, mailed on Apr. 29, 2021, 11 pages.
International Preliminary Report on Patentability received for PCT Patent Application No. PCT/SE2020/050504, mailed on Dec. 2, 2021, 10 pages.
International Preliminary Report on Patentability received for PCT Patent Application No. PCT/SE2020/051117, mailed on Jun. 9, 2022, 10 pages.
International Preliminary Report on Patentability received for PCT Patent Application No. PCT/SE2020/051172, mailed on Jun. 16, 2022, 8 pages.
International Preliminary Report on Patentability received for PCT Patent Application No. PCT/SE2021/050040, mailed on Aug. 25, 2022, 13 pages.
International Preliminary Report on Patentability received for PCT Patent Application No. PCT/SE2021/050095, mailed on Aug. 18, 2022, 11 pages.
International Preliminary Report on Patentability received for PCT Patent Application No. PCT/SE2021/051018, mailed on May 4, 2023, 8 pages.
International Preliminary Report on Patentability received for PCT Patent Application No. PCT/SE2021/051151, mailed on Jun. 1, 2023, 10 pages.
International Preliminary Report on Patentability received for PCT Patent Application No. PCT/SE22/050139, mailed on Aug. 24, 2023, 9 pages.
International Preliminary Report on Patentability received in International Application No. PCT/SE2017/051233, dated Jun. 11, 2019, in 6 pages.
International Search Report and Written Opinion for International App. No. PCT/SE2019/050343, dated Sep. 3, 2019, in 13 pages.
International Search Report and Written Opinion issued in International Application No. PCT/SE2010/051103 dated Jan. 25, 2011.
International Search Report and Written Opinion issued in International Application No. PCT/SE2010/051105 dated Nov. 16, 2010.
International Search Report and Written Opinion issued in International Application No. PCT/SE2010/051107 dated Jan. 24, 2011.
International Search Report and Written Opinion of the International Searching Authority for PCT/SE2021/051018, dated Feb. 1, 2022, in 10 pages.
International Search Report and Written Opinion received for PCT Patent Application No. PCT/EP2018/052757, mailed on Apr. 23, 2018, 9 pages.

(56) References Cited

OTHER PUBLICATIONS

International Search Report and Written Opinion received for PCT Patent Application No. PCT/EP2019/077054, mailed on Jan. 10, 2020, 9 pages.
International Search Report and Written Opinion received for PCT Patent Application No. PCT/JP2019/001801, mailed on Apr. 23, 2019, 13 pages (6 pages of English Translation and 7 pages of Original Document).
International Search Report and Written Opinion received for PCT Patent Application No. PCT/SE2009/051364, mailed on May 4, 2010, 15 pages.
International Search Report and Written Opinion received for PCT Patent Application No. PCT/SE2011/050520, mailed on Aug. 18, 2011, 8 pages.
International Search Report and Written Opinion received for PCT Patent Application No. PCT/SE2012/050086, mailed on May 23, 2012, 9 pages.
International Search Report and Written Opinion received for PCT Patent Application No. PCT/SE2012/051419, mailed on Aug. 26, 2013, 8 pages.
International Search Report and Written Opinion received for PCT Patent Application No. PCT/SE2013/050064, mailed on Sep. 12, 2013, 10 pages.
International Search Report and Written Opinion received for PCT Patent Application No. PCT/SE2013/050137, mailed on Oct. 15, 2013, 9 pages.
International Search Report and Written Opinion received for PCT Patent Application No. PCT/SE2013/050473, mailed on Feb. 3, 2014, 11 pages.
International Search Report and Written Opinion received for PCT Patent Application No. PCT/SE2013/050585, mailed on Jan. 21, 2014, 13 pages.
International Search Report and Written Opinion received for PCT Patent Application No. PCT/SE2013/051044, mailed on Mar. 20, 2014, 9 pages.
International Search Report and Written Opinion received for PCT Patent Application No. PCT/SE2013/051533, mailed on Apr. 15, 2014, 10 pages.
International Search Report and Written Opinion received for PCT Patent Application No. PCT/SE2013/051534, mailed on May 6, 2014, 11 pages.
International Search Report and Written Opinion received for PCT Patent Application No. PCT/SE2013/051537, mailed on Apr. 25, 2014, 12 pages.
International Search Report and Written Opinion received for PCT Patent Application No. PCT/SE2014/050435, mailed on Jun. 12, 2014, 11 pages.
International Search Report and Written Opinion received for PCT Patent Application No. PCT/SE2014/050437, mailed on Jul. 1, 2014, 9 pages.
International Search Report and Written Opinion received for PCT Patent Application No. PCT/SE2014/050438, mailed on Jul. 1, 2014, 9 pages.
International Search Report and Written Opinion received for PCT Patent Application No. PCT/SE2014/050701, mailed on Nov. 6, 2014, 11 pages.
International Search Report and Written Opinion received for PCT Patent Application No. PCT/SE2014/051363, mailed on Feb. 12, 2015, 9 pages.
International Search Report and Written Opinion received for PCT Patent Application No. PCT/SE2015/050041, mailed on Apr. 29, 2015, 12 pages.
International Search Report and Written Opinion received for PCT Patent Application No. PCT/SE2015/050042, mailed on Sep. 28, 2015, 14 pages.
International Search Report and Written Opinion received for PCT Patent Application No. PCT/SE2015/050043, mailed on May 19, 2015, 12 pages.
International Search Report and Written Opinion received for PCT Patent Application No. PCT/SE2015/050044, mailed on May 19, 2015, 11 pages.
International Search Report and Written Opinion received for PCT Patent Application No. PCT/SE2015/050724, mailed on Oct. 6, 2015, 10 pages.
International Search Report and Written Opinion received for PCT Patent Application No. PCT/SE2016/050053, mailed on May 2, 2016, 16 pages.
International Search Report and Written Opinion received for PCT Patent Application No. PCT/SE2016/050098, mailed on Jun. 29, 2016, 13 pages.
International Search Report and Written Opinion received for PCT Patent Application No. PCT/SE2016/050155, mailed on Jul. 15, 2016, 10 pages.
International Search Report and Written Opinion received for PCT Patent Application No. PCT/SE2016/051229, mailed on Mar. 10, 2017, 18 pages.
International Search Report and Written Opinion received for PCT Patent Application No. PCT/SE2017/051233, mailed on Mar. 12, 2018, 10 pages.
International Search Report and Written Opinion received for PCT Patent Application No. PCT/SE2018/050109, mailed on May 3, 2018, 15 pages.
International Search Report and Written Opinion received for PCT Patent Application No. PCT/SE2018/050817, mailed on Jan. 28, 2019, 12 pages.
International Search Report and Written Opinion received for PCT Patent Application No. PCT/SE2018/050896, mailed on Nov. 27, 2018, 13 pages.
International Search Report and Written Opinion received for PCT Patent Application No. PCT/SE2019/050190, mailed on Jun. 12, 2019, 11 pages.
International Search Report and Written Opinion received for PCT Patent Application No. PCT/SE2019/050193, mailed on Apr. 10, 2019, 11 pages.
International Search Report and Written Opinion received for PCT Patent Application No. PCT/SE2019/050195, mailed on Jun. 12, 2019, 13 pages.
International Search Report and Written Opinion received for PCT Patent Application No. PCT/SE2020/050504, mailed on Sep. 4, 2020, 13 pages.
International Search Report and Written Opinion received for PCT Patent Application No. PCT/SE2022/050139, mailed on Apr. 8, 2022, 12 pages.
International Search Report and Written Opinion received for PCT Patent Application No. PCT/SE2011/050871, mailed on Nov. 28, 2011, 13 pages.
International Search Report and Written Opinion received in International Application No. PCT/SE2021/051151 dated Jan. 26, 2022, in 13 pages.
International Search Report for International App. No. PCT/IB2017/057201, dated Mar. 6, 2018, in 4 pages.
International Search Report for International App. No. PCT/SE2017/050102, dated Apr. 5, 2017, in 4 pages.
International Search Report for International App. No. PCT/SE2017/051224, dated Feb. 23, 2018, in 5 pages.
International Search Report for International App. No. PCT/SE2018/050070, dated Apr. 25, 2018, in 4 pages.
International Search Report for International App. No. PCT/SE2019/050953, dated Nov. 26, 2019, in 4 pages.
International Search Report in App. No. PCT/SE2020/051117 dated Feb. 5, 2021 in 2 pages.
International Search Report in International Application No. PCT/SE2020/051172 dated Feb. 4, 2021 in 5 pages.
International Search Report in International Application No. PCT/SE2021/050040 dated May 10, 2021 in 3 pages.
International Search Report in International Application No. PCT/SE2021/050095 dated Jun. 2, 2021 in 7 pages.
International Search Report in PCT/SE2019/050189 dated May 29, 2019 in 5 pages.
International Search Report received for PCT Patent Application No. PCT/SE2015/050087, mailed on May 6, 2015, 4 pages.

(56) References Cited

OTHER PUBLICATIONS

Johnson, M., "Enhanced Optical Touch Input Panel", IBM Technical Disclosure Bulletin, 1985, in 3 pages.
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 127 pages, (uploaded in 4 parts, part 1 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 128 pages, (uploaded in 4 parts, part 4 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 65 pages, (uploaded in 4 parts, part 3 of 4).
Joint Claim Construction Brief, *Flatfrog Laboratories AB v. Promethean Ltd. and Promethean Inc.*, C.A. No. 1:19-cv-02246-MN, dated Sep. 20, 2021, in 92 pages.
Kak, et al., "Principles of Computerized Tomographic Imaging", Institute of Electrical Engineers, Inc., 1999, in 333 pages.
Kar-Han Tan, Robinson I N, Culbertson B, Apostolopoulos J, 'ConnectBoard: Enable Genuine Eye Contact and Accurate Gaze in Remote Collaboration', In: IEEE Transaction on Multimedia, Jun. 2011, vol. 13, No. 3, ISSN: 1520-9210.
Kart, M., "Entwicklung and Bau einer neuartigen Mehrfinger-Touchscreen basierend auf frustrierter Totalreflexion," Landeswettbewerb in Bayern 2008 Jugend Forscht, Apr. 1, 2008.
Liu, J., et al. "Multiple touch points identifying method, involves starting touch screen, driving specific emission tube, and computing and transmitting coordinate of touch points to computer system by direct lines through interface of touch screen," 2007, in 25 pages.
Machine translation of CN 108345414A (Year: 2018).
Machine translation of JP 11-85399 (Year: 1999).
Machine translation of KR20160075643A (Year: 2016).
Mu, Cong et al. "Dielectric multilayer angular filters for coupling LEDs to thin light guides." Proc SPIE 8170 (2011): 817001-1-817001-10.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Notice of Service, *Flatfrog Laboratories AB v. Promethean Ltd. and Promethean Inc.*, C.A. No. 1:19-cv-02246-MN, dated Apr. 23, 2021, in 2 pages.
O'Rourke, Joseph, "Computational Geometry In C", Second Edition, Cambridge University Press, (1998), pp. 252-264.
Panzer, et al., "Tunable Infrared Emission From Printed Colloidal Quantum Dot/Polymer Composite Films on Flexible Substrates", published in Journal of Display Technology, vol. 6, No. 3, Mar. 2010.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Press et al., "Numerical Recipes The Art of Scientific Computing", Third Edition, Cambridge University Press, 2007, pp. 1-1235.
Report on the Filing or Determination of an Action Regarding a Patent or Trademark. For U.S. Pat. No. 10,282,035, U.S. District of Delaware, dated Dec. 10, 2019, in 1 page.
Scheuplein, Robert J., Ph.D. "A Survey of Some Fundamental Aspects of the Absorption and Reflection of Light by Tissue." J. Soc. Cos. Chem. 15 (1964): 111-122.
Summons in a Civil Action to Promethean Inc., C.A. No. 19-2246, dated Dec. 10, 2019 in 2 pages.
Supplementary European Search Report dated Aug. 14, 2015 issued in corresponding European Application No. 13744212.
Supplementary European Search Report for European App. No. EP 13752508, dated Aug. 27, 2015.
Supplementary European Search Report for European App. No. EP 16749542, dated Sep. 17, 2018, in 9 pages.
Supplementary European Search Report for European App. No. EP 16759213, dated Oct. 4, 2018, in 9 pages.
Swedish Search Report in Application No. 1350181.2 dated Dec. 11, 2013.
Swedish Search Report in Application No. 1450651.3 dated Dec. 22, 2014.
Tedaldi, M., et al. "Refractive index mapping of layered samples using optical coherence refractometry," Proceedings of SPIE, vol. 7171, 2009, in 8 pages.
The Laser Wall, MIT, 1997, http://web.media.mit.edu/~joep/SpectrumWeb/captions/Laser.html.
Thomas, G.L et al., "Some observations on fingerprint deposits." J. Phys. D: Appl. Phys. 8 (1975): 724-729.
Ahn, Y., et al., "A slim and wide multi-touch tabletop interface and its applications," BigComp2014, IEEE, 2014, in 6 pages.
Anderson, R. Rox, B.S., and John A. Parrish, M.D. "The Optics of Human Skin." Journal of Investiaative Dermatoloav 77.1 (1981): 13-19.
ASTM International, "Standard Specification for Heat-Treated Flat Glass-Kind HS, Kind FT Coated and Uncoated Glass," Designation: C 1048-04, in 7 pages.
Barzilai et al., "Two-Point Step Size Gradient Methods", IMA Journal of Numerical Analysis, 1988, pp. 141-148.
Bose, R, "Strongly regular graphs, partial geometries and partially balanced designs", Pacific J. Math., vol. 13, No. 2 (1963), pp. 389-419.
British Standard, "Glass in building—Thermally toughened soda lime silicate safety glass," EN 12150-1:2000, ISBN O 580 36171 3, Aug. 15, 2000, in 28 pages.
Chen. Yhun, "Using micro-structures to couple light into thin light-guides," Master Of Science Thesis, Stockholm, 2011.
Chou, N., et al., "Generalized pseudo-polar Fourier grids and applications in regfersting optical coherence tomography images," 43rd Asilomar Conference on Signals, Systems and Computers, Nov. 2009, in 5 paaes.
Civil Cover Sheet *Flatfrog Laboratories AB v. Promethean Ltd. and Promethean Inc.*, dated Dec. 10, 2019, in 1 page.
Complaint for Patent Infringement, *Flatfrog Laboratories AB v. Promethean Ltd. And Promethean Inc.*, C.A. No. 19-2246, dated Dec. 10, 2019, in 83 pages.
Cornelissen, Hugo J. et al. "Injecting Light of High-Power LEDs into Thin Light Guides." Proc. SPIE 7652. International Optical Design Conference (2010): 7652121-7652126.
Defendants Promethean Ltd. and Promethean Inc.'s Preliminary Proposed Claim Constructions, *Flatfrog Laboratories AB v. Promethean Ltd. and Promethean Inc.*, C.A. No. 1:19-cv-02246-MN, dated May 24, 2021, in 8 pages.
Defendants' Sur-Reply Claim Construction Brief, *Flatfrog Laboratories AB v. Promethean Ltd. and Promethean Inc.*, C.A. No. 1:19-cv-02246-MN, dated Sep. 13, 2021, in 24 pages.
Defendants' Answer to Second Amended Complaint and Defendant Promethean Inc.'s Counterclaims Against FlatFrog Laboratories Ab., C.A. No. 19-2246, dated May 22, 2020, in 29 pages.
Defendants' Initial Invalidity Contentions, *Flatfrog Laboratories AB v. Promethean Ltd. and Promethean Inc.*, C.A. No. 1:19-cv-02246-MN, dated Apr. 23, 2021, in 26 pages.
Ericson, Chris, "Real-Time Collision Detection", The Morgan Kaufmann Series in Interactive 30 Technology (2005) Chapters 5-9, pp. 125-412.
European Search Report dated Apr. 19, 2012 issued in European Application No. 09830665.7.
European Search Report dated Jan. 23, 2014 issued in corresponding European Appln. No. 13183545.6.
European Search Report issued in European Application No. 11777650.0, dated Nov. 22, 2013.
Executed Summons in a Civil Action to Promethean Inc., C.A. No. 19-2246, dated Dec. 10, 2019 in 2 pages.
Exhibit 1: Invalidity Claim Chart Against U.S. Pat. No. 10,775,935 Based on Prior Public Use and/or Commercial Offer for Sale of

(56) References Cited

OTHER PUBLICATIONS

Defendant Promethean Inc.'s ActivPanel 4.5 Product, *Flatfrog Laboratories AB* v. *Promethean Ltd. and Promethean Inc.*, C.A. No. 1:19-cv-02246-MN, dated Apr. 23, 2021, in 43 pages.
Exhibit 10: Invalidity Claim Chart Against U.S. Pat. No. 10,739,916 Based on International App. Pub. No. WO2014131221 to Chen et al., *Flatfrog Laboratories AB* v. *Promethean Ltd. and Promethean Inc.*, C.A. No. 1:19-cv-02246-MN, dated Apr. 23, 2021, in 4 pages.
Exhibit 11: Invalidity Claim Chart Against U.S. Pat. No. 10,739,916 Based on Chinese Pub. App. No. 104391611 A to Hu et al., *Flatfrog Laboratories AB* v. *Promethean Ltd. and Promethean Inc.*, C.A. No. 1:19-cv-02246-MN, dated Apr. 23, 2021, in 4 pages.
Exhibit 12: Invalidity Claim Chart Against U.S. Pat. No. 10,739,916 Based on Chinese Utility Model No. 203786708 U to Cao, *Flatfrog Laboratories AB* v. *Promethean Ltd. and Promethean Inc.*, C.A. No. 1:19-cv-02246-MN, dated Apr. 23, 2021, in 4 pages.
Exhibit 13: Invalidity Claim Chart Against U.S. Pat. No. 10,739,916 Based on Chinese Utility Model No. 204288179 U to Mo et al., *Flatfrog Laboratories AB* v. *Promethean Ltd. and Promethean Inc.*, C.A. No. 1:19-cv-02246-MN, dated Apr. 23, 2021, in 4 pages.
Exhibit 2: Invalidity Claim Chart Against U.S. Pat. No. 10,775,935 Based on U.S. Pre-Grant Pub. No. 2019/0235701 to Han et al., *Flatfrog Laboratories AB* v. *Promethean Ltd. and Promethean Inc.*, C.A. No. 1:19-cv-02246-MN, dated Apr. 23, 2021, in 16 pages.
Exhibit 3A: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.*, C.A. No. 1:19-cv-02246-MN, dated Apr. 23, 2021, in 13 pages.
Exhibit 3B: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.*, C.A. No. 1:19-cv-02246-MN, dated Apr. 23, 2021, in 14 pages.
Exhibit 3C: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.*, C.A. No. 1:19-cv-02246-MN, dated Apr. 23, 2021, in 13 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.*, C.A. No. 1:19-cv-02246-MN, dated Apr. 23, 2021, in 14 pages.
Exhibit 4B: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.*, C.A. No. 1:19-cv-02246-MN, dated Apr. 23, 2021, in 15 pages.
Exhibit 4C: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.*, C.A. No. 1:19-cv-02246-MN, dated Apr. 23, 2021, in 14 pages.
Exhibit 5A: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.*, C.A. No. 1:19-cv-02246-MN, dated Apr. 23, 2021, in 13 pages.
Exhibit 5B: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.*, C.A. No. 1:19-cv-02246-MN, dated Apr. 23, 2021, in 15 pages.
Exhibit 5C: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.*, C.A. No. 1:19-cv-02246-MN, dated Apr. 23, 2021, in 13 pages.
Exhibit 6A: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.*, C.A. No. 1:19-cv-02246-MN, dated Apr. 23, 2021, in 9 pages.
Exhibit 6B: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.*, C.A. No. 1:19-cv-02246-MN, dated Apr. 23, 2021, in 9 pages.
Exhibit 6C: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.*, C.A. No. 1:19-cv-02246-MN, dated Apr. 23, 2021, in 9 pages.
Exhibit 7A: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.*, C.A. No. 1:19-cv-02246-MN, dated Apr. 23, 2021, in 9 pages.
Exhibit 7B: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.*, C.A. No. 1:19-cv-02246-MN, dated Apr. 23, 2021, in 9 pages.
Exhibit 7C: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.*, C.A. No. 1:19-cv-02246-MN, dated Apr. 23, 2021, in 9 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB* v. *Promethean Ltd. and Promethean Inc.*, C.A. No. 1:19-cv-02246-MN, dated Apr. 23, 2021, in 21 pages.
Exhibit 9: Invalidity Claim Chart Against U.S. Pat. No. 10,739,916 Based on Chinese Utility Model No. CN 203786707 U to Chen et al., *Flatfrog Laboratories AB* v. *Promethean Ltd. and Promethean Inc.*, C.A. No. 1:19-cv-02246-MN, dated Apr. 23, 2021, in 4 pages.
Extended (Supplementary) European Search Report dated Apr. 30, 2021, issued in counterpart EP application No. 19775915.2. (8 pages).
Extended European Search Report for European App. No. 16743795.3, dated Sep. 11, 2018, in 5 pages.
Extended European Search Report for European App. No. 18772178.2, dated Dec. 10, 2020, in 8 pages.
Extended European Search Report for European App. No. 18772370.5, dated Dec. 9, 2020, in 8 pages.
Extended European Search Report for European App. No. 18774232.5, dated Dec. 21, 2020, in 9 pages.
Extended European Search Report in European Application No. 16873465.5, date Jun. 25, 2019 in 9 pages.
Extended European Search Report in European Application No. 17750516.1, dated Jul. 16, 2019 in 4 pages.
Extended European Search Report in European Application No. 19165019.1, dated Jul. 18, 2019 in 8 pages.
Farghal, et al., "Electromagnetic Modeling of Outcoupling Efficiency and Light Emission In Near-Infrared Quantum Dot Light Emitting Devices", published in Progress In Electromagnetics Research B., vol. 24, 263-284, 2010.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Giphy | Stickers | Closer Look Sticker by Cavan Infante, posted on May 24, 2019 by Cavan Infante, no copyright date posted [online], [site visited Oct. 13, 2020], Available from Internet, <URL: https://giphy.com/stickers/circle-underline-cavan-ZbB9ICitwN43fJvNSz/>.
Giphy I Randy, the Badly Drawn Horse, posted on Feb. 12, 2020 by T.L. McBeth, no copyright date posted [online], [site visited Oct. 13, 2020]. Available from Internet, <URL: https://giphy.com/stories/randy-the-badly-drawn-horse-258d6753-fb29/>.
Golub et al.: "Matrix Norms" in: "Matrix Computations" Aug. 21, 2005 (Aug. 21, 2005), Johns Hopkins University Press, oaaes 54-59.s.
Holzammer, Andreas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf.
Horwood, A. et al.: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_ImageNormali zation.pdf*Paae 9, line 1—Paae 14, line 1.

(56) References Cited

OTHER PUBLICATIONS

Iizuka, K., "Boundaries, Near-Field Optics, and Near-Field Imaging," Elements of Photonics, vol. 1: In Free Space and Special Media, Wiley & Sons, 2002, in 57 pages.
International Preliminary Report on Patentability received for PCT Patent Application No. PCT/EP2018/052757, mailed on Aug. 15, 2019, 7 pages.
International Preliminary Report on Patentability received for PCT Patent Application No. PCT/EP2019/077054, mailed on Apr. 29, 2021, 7 pages.
International Preliminary Report on Patentability received for PCT Patent Application No. PCT/IB2017/057201, mailed on Jun. 6, 2019, 8 pages.
International Preliminary Report on Patentability received for PCT Patent Application No. PCT/JP2019/001801, mailed on Oct. 15, 2020, 12 pages (6 pages of English Translation and 6 pages of Original Document).
International Preliminary Report on Patentability received for PCT Patent Application No. PCT/SE2009/051364, mailed on Jun. 16, 2011, 11 pages.
International Preliminary Report on Patentability received for PCT Patent Application No. PCT/SE2011/050520, mailed on Nov. 15, 2012, 6 pages.
International Preliminary Report on Patentability received for PCT Patent Application No. PCT/SE2011/050871, mailed on Jan. 17, 2013, 10 pages.
International Preliminary Report on Patentability received for PCT Patent Application No. PCT/SE2012/050086, mailed on Aug. 15, 2013, 8 pages.
International Preliminary Report on Patentability received for PCT Patent Application No. PCT/SE2012/051419, mailed on Jul. 3, 2014, 6 pages.
International Preliminary Report on Patentability received for PCT Patent Application No. PCT/SE2013/050064, mailed on Aug. 14, 2014, 7 pages.
International Preliminary Report on Patentability received for PCT Patent Application No. PCT/SE2013/050137, mailed on Sep. 4, 2014, 6 pages.
International Preliminary Report on Patentability received for PCT Patent Application No. PCT/SE2013/050473, mailed on Nov. 13, 2014, 8 pages.
International Preliminary Report on Patentability received for PCT Patent Application No. PCT/SE2013/050585, mailed on Dec. 4, 2014, 10 pages.
International Preliminary Report on Patentability received for PCT Patent Application No. PCT/SE2013/051044, mailed on Mar. 26, 2015, 7 pages.
International Preliminary Report on Patentability received for PCT Patent Application No. PCT/SE2013/051533, mailed on Jul. 2, 2015, 8 pages.
International Preliminary Report on Patentability received for PCT Patent Application No. PCT/SE2013/051534, mailed on Jul. 2, 2015, 8 pages.
International Preliminary Report on Patentability received for PCT Patent Application No. PCT/SE2013/051537, mailed on Jul. 2, 2015, 9 pages.
International Preliminary Report on Patentability received for PCT Patent Application No. PCT/SE2014/050435, mailed on Oct. 22, 2015, 8 pages.
International Preliminary Report on Patentability received for PCT Patent Application No. PCT/SE2014/050437, mailed on Oct. 22, 2015, 6 pages.
International Preliminary Report on Patentability received for PCT Patent Application No. PCT/SE2014/050438, mailed on Oct. 22, 2015, 6 pages.
International Preliminary Report on Patentability received for PCT Patent Application No. PCT/SE2014/050701, mailed on Jan. 21, 2016, 8 pages.
International Preliminary Report on Patentability received for PCT Patent Application No. PCT/SE2014/051363, mailed on Jun. 2, 2016, 6 pages.
International Preliminary Report on Patentability received for PCT Patent Application No. PCT/SE2015/050041, mailed on Jul. 28, 2016, 10 pages.
International Preliminary Report on Patentability received for PCT Patent Application No. PCT/SE2015/050042, mailed on Jul. 28, 2016, 10 pages.
International Preliminary Report on Patentability received for PCT Patent Application No. PCT/SE2015/050043, mailed on Jul. 28, 2016, 9 pages.
International Preliminary Report on Patentability received for PCT Patent Application No. PCT/SE2015/050044, mailed on Jul. 28, 2016, 8 pages.
International Preliminary Report on Patentability received for PCT Patent Application No. PCT/SE2015/050724, mailed on Jan. 5, 2017, 7 pages.
International Preliminary Report on Patentability received for PCT Patent Application No. PCT/SE2016/050053, mailed on Aug. 10, 2017, 13 pages.
International Preliminary Report on Patentability received for PCT Patent Application No. PCT/SE2016/050098, mailed on Aug. 24, 2017, 9 pages.
International Preliminary Report on Patentability received for PCT Patent Application No. PCT/SE2016/050155, mailed on Sep. 14, 2017, 7 pages.
International Preliminary Report on Patentability received for PCT Patent Application No. PCT/SE2016/051229, mailed on Jun. 21, 2018, 15 pages.
International Preliminary Report on Patentability received for PCT Patent Application No. PCT/SE2017/050102, mailed on Aug. 23, 2018, 9 pages.
International Preliminary Report on Patentability received for PCT Patent Application No. PCT/SE2017/051224, mailed on Feb. 26, 2019, 13 pages.
International Preliminary Report on Patentability received for PCT Patent Application No. PCT/SE2018/050070, mailed on Aug. 22, 2019, 10 pages.
International Preliminary Report on Patentability received for PCT Patent Application No. PCT/SE2018/050109, mailed on Oct. 10, 2019, 12 pages.
International Preliminary Report on Patentability received for PCT Patent Application No. PCT/SE2018/050817, mailed on Mar. 5, 2020, 9 pages.
International Preliminary Report on Patentability received for PCT Patent Application No. PCT/SE2018/050896, mailed on Mar. 19, 2020, 10 pages.
International Preliminary Report on Patentability received for PCT Patent Application No. PCT/SE2019/050189, mailed on Sep. 17, 2020, 9 pages.
International Preliminary Report on Patentability received for PCT Patent Application No. PCT/SE2019/050190, mailed on Sep. 17, 2020, 8 pages.
International Preliminary Report on Patentability received for PCT Patent Application No. PCT/SE2019/050193, mailed on Sep. 17, 2020, 8 pages.

\* cited by examiner

OPTICAL COUPLING IN TOUCH-SENSING SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to touch-sensing apparatus that operate by propagating light by diffusive light scattering above a thin light transmissive panel, and in particular to optical solutions for defining the location of the light paths.

Description of the Related Art

In one category of touch-sensitive panels known as 'above surface optical touch systems', a set of optical emitters are arranged around the periphery of a touch surface to emit light that is reflected to travel and propagate above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors.

In a variant of such 'above surface optical touch system', illustrated in FIG. 1, the light from the emitters 109 propagate above the touch surface 102 of the panel via reflection or scattering on an edge reflector or diffusor 130. The light will then continue until deflected by a corresponding edge reflector at an opposing edge of the light transmissive panel, where the light will be scattered back down through the transmissive panel and onto the detectors. Thus, irrespectively of the propagation path, via FTIR or above-surface reflection, the light is initially coupled into the light transmissive panel 101, via a rear surface 106 thereof. Such solution may allow for tolerating larger variations of the properties of the edges of the panel since the edges lie in the outside periphery of the components and light paths mentioned above. However, there may be some signal loss with respect to the part of the light that is scattered to travel above the touch surface, since this light is also coupled through the panel. Furthermore, such an arrangement necessitates that the diffusor 130 overlays the edges 131 of the touch surface 102, so that area available for the touch surface is reduced and that height is added along the edges of the panel. Adding components on top of the light transmissive panel may also compromise the robustness of the system. For example, the thermal expansion coefficients of such components and the light transmissive panel may be different, causing the components to come loose from the panel as a result of temperature variations during operation of the touch system. Even a small or local detachment may cause a significant decrease in the performance of the system.

Some prior art systems rely on coupling and propagation of collimated light across the light transmissive panel. Such systems are however cumbersome to reliably implement due to the small tolerances with respect to the alignment of the components thereof. E.g. the light emitters—and detectors need to be precisely aligned in relation to various lenses and reflect the light via concave and/or convex reflection and/or refraction to get the desired collimation. Such precise alignment may be difficult to achieve in mass production. The use of collimated light, or light reflected by means of specular reflection, also adds to this complexity, which in turn results in a more expensive and less compact system. Furthermore, to reduce system cost, it may be desirable to minimize the number of electro-optical components.

SUMMARY OF THE INVENTION

An objective is to at least partly overcome one or more of the above identified limitations of the prior art.

One objective is to provide a touch-sensitive apparatus based on "above-surface" light propagation which is robust and compact.

Another objective is to provide an "above-surface"-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

According to a first aspect a touch sensing apparatus is provided, comprising a light transmissive panel that defines a touch surface, an opposite rear surface, and panel sides extending between the touch surface and rear surface. The panel sides define a perimeter of the light transmissive panel. The touch sensing apparatus comprises a plurality of light emitters and detectors arranged along the perimeter and adjacent the panel sides, a light guide arranged along the perimeter and having a first reflective surface comprising a diffusive light scattering element. The light emitters are arranged to emit a respective beam of light onto the diffusive light scattering element so as to generate propagating light that diffusively propagates above the touch surface, wherein the light detectors are arranged to receive detection light generated as said propagating light impinges on the diffusive light scattering element, and wherein the diffusive light scattering element is arranged at least partly outside the panel sides and extending at least partly above the touch surface.

Some examples of the disclosure provide for a more robust touch sensing apparatus.

Some examples of the disclosure provide for a more compact touch sensing apparatus.

Some examples of the disclosure provide for a touch sensing apparatus that is easier to manufacture.

Some examples of the disclosure provide for a touch sensing apparatus that is less costly to manufacture.

Some examples of the disclosure provide for a touch sensing apparatus that is more reliable to use.

Some examples of the disclosure provide for a touch sensing apparatus with improved scalability for differently sized touch surfaces.

Some examples of the disclosure provide for a touch sensing apparatus that has a better signal-to-noise ratio of the detected light.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION OF THE PREFERRED EMBODIMENT

Figure 1:
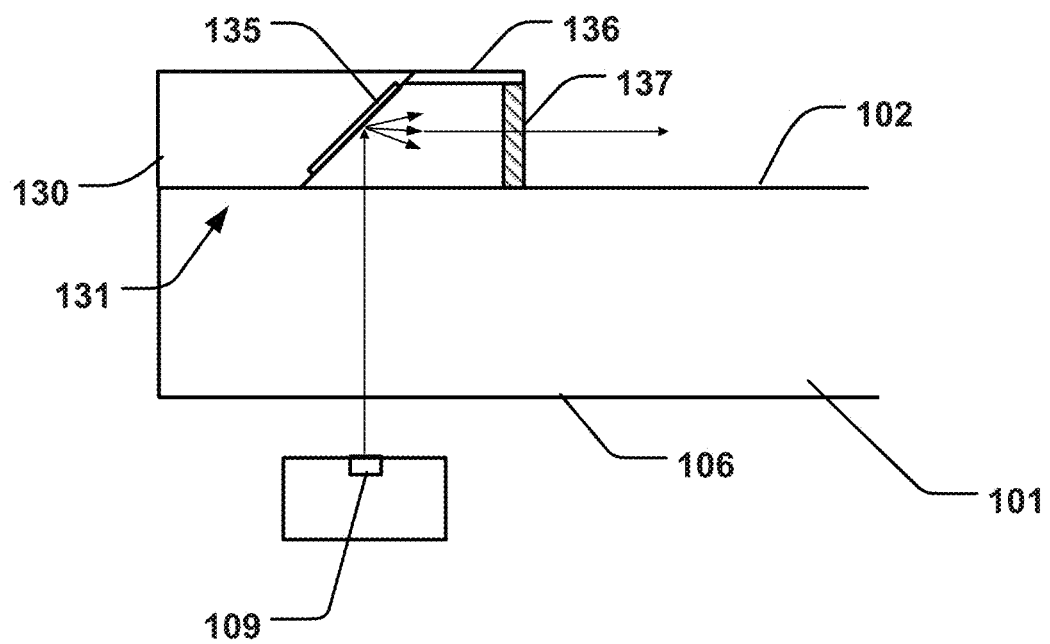
FIG. 1 is a section view of a touch-sensitive apparatus according to the prior art.

In the following, embodiments of the present invention will be presented for a specific example of a touch-sensitive apparatus. Throughout the description, the same reference numerals are used to identify corresponding elements.

FIG. 1 schematically illustrates a variant of an 'above surface optical touch system', as discussed in the Background Art section above, where the light from the emitters 109 propagate above the touch surface 102 of the panel via reflection on an edge reflector 130.

Figure 2A:
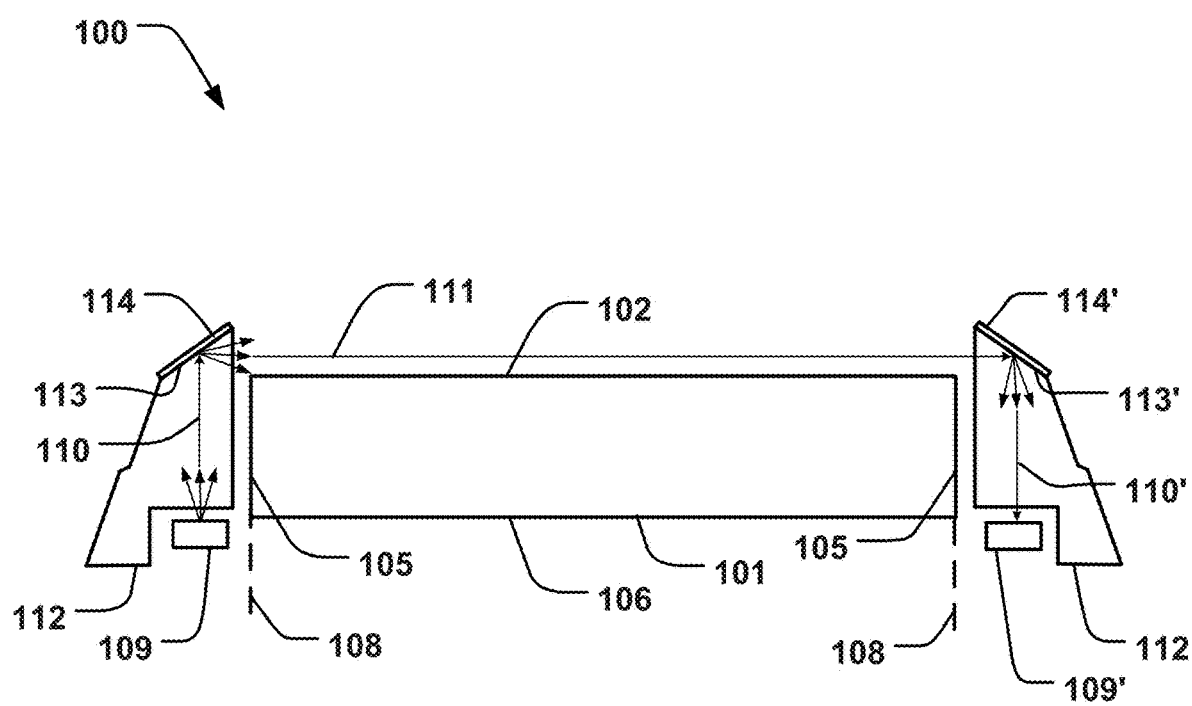
FIG. 2a is a schematic illustration, in a cross-sectional side view, of a light transmissive apparatus according to one example.
Figure 5:
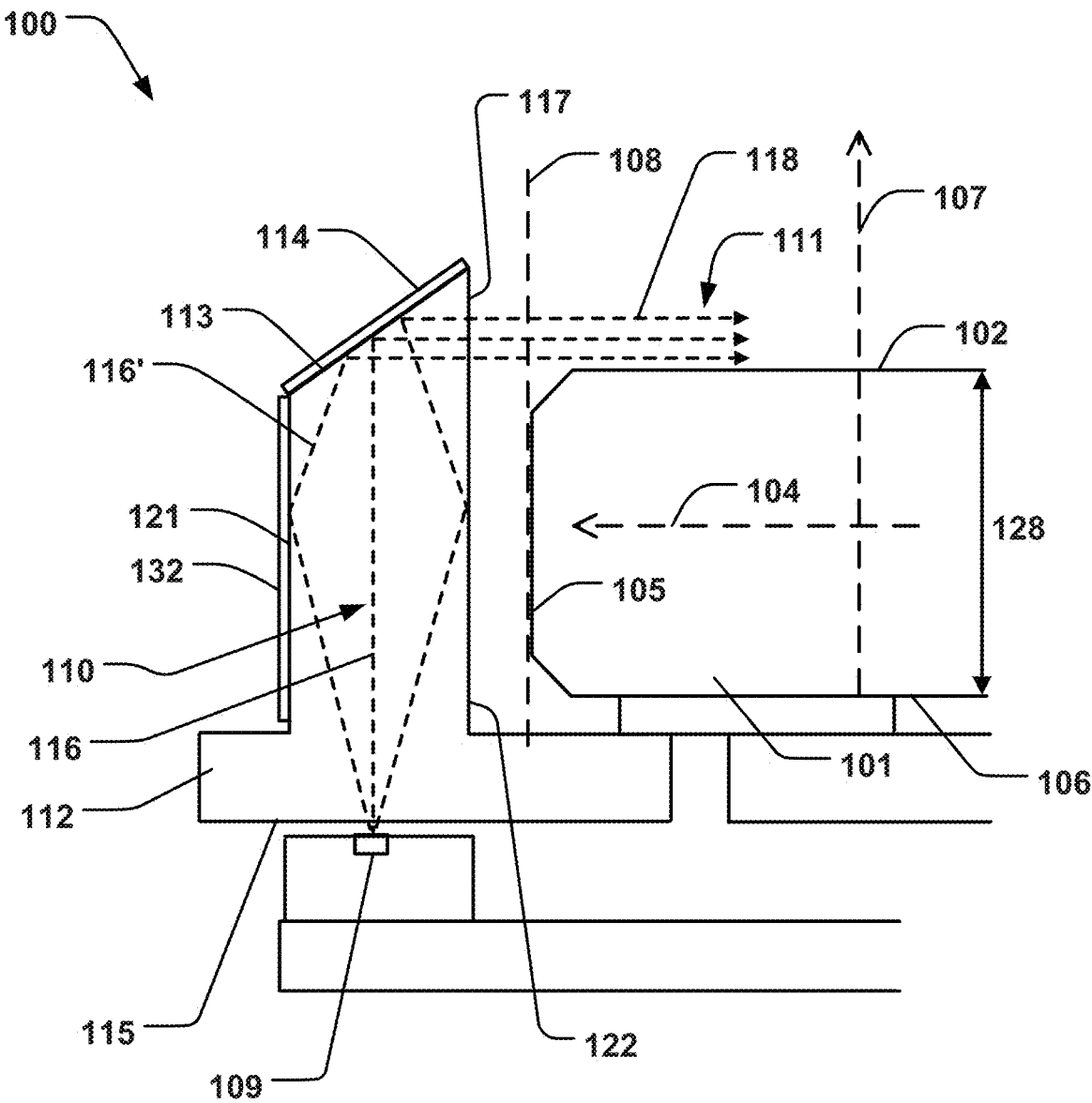
FIG. 5 is a schematic illustration, in a cross-sectional side view, of a detail of a light transmissive apparatus according to one example.

FIG. 2a schematically illustrate a touch sensing apparatus 100 comprising a light transmissive panel 101 that defines a touch surface 102, an opposite rear surface 106, and panel sides 105 extending between the touch surface 102 and the rear surface 106. Thus, the panel sides 105 define a perimeter 108 of the light transmissive panel 101. The touch sensing apparatus 100 further comprises a plurality of light emitters 109 and detectors 109' arranged along the perimeter 108 and adjacent the panel sides 105. A light guide 112 is arranged along the perimeter 108 of the light transmissive panel 101. The light guide 112 has a first reflective surface 113, 113' comprising a diffusive light scattering element 114, 114'. The light emitters 109 are arranged to emit a respective beam of light 110 onto the diffusive light scattering element 114 so as to scatter light 111 that propagates above the touch surface 102. The first reflective surface 113 is thus angled in relation to the light emitter 109 such that the beam of light 110 is diffusively scattered towards the touch surface 102. Similarly, the light detectors 109' are arranged to receive detection light 110' generated as the propagating light 111 impinges on the diffusive light scattering element 114' of the corresponding first reflective surface 113'. The first reflective surface 113' is in this case angled in relation to the touch surface 102 such that the light 111 propagating over the touch surface 102 is diffusively scattered towards the detector 109'. Each diffusive light scattering element 114' will act as a light source ("virtual light source") that diffusively emits "detection light" for receipt by the detector 109'. As schematically illustrated in FIGS. 2, 3, and 5, the diffusive light scattering element 114, 114', is arranged at least partly outside the panel sides 105, i.e. outside the perimeter 108 of the panel 105, and extending at least partly above the touch surface 102. Having the diffusive light scattering element 114, 114', arranged at least partly outside the panel sides 105, provides for optimizing of signal to noise ratio of the detected light 110' when using an "above-surface" optical touch system, since light can be guided around the edges 105 of the panel without having to pass through the panel 105. Furthermore, this simultaneously increases the benefit and efficiency of the virtual light source provided by the reflection on the first reflective surface 113 due to the diffusive light scattering element 114 thereof. I.e. a minimum of light 110 is lost from the emitter 109 before the light 110 reaches the light scattering element 114. This means that the emitter 109 is effectively moved to the position of the light scattering element 114, thereby allowing for an optimized diffusive scattering of light above and across the touch surface 102. This in turn provides for improved accuracy, usability and robustness of the touch sensing apparatus 100. Cumbersome alignment of the optical components is also avoided, since the diffusively scattering light source is effectively moved directly to the virtual- or secondary diffusive light source position, above the touch surface 102. This provides for a touch sensing apparatus that is less complex to manufacture, facilitating mass production.

Figure 2B:
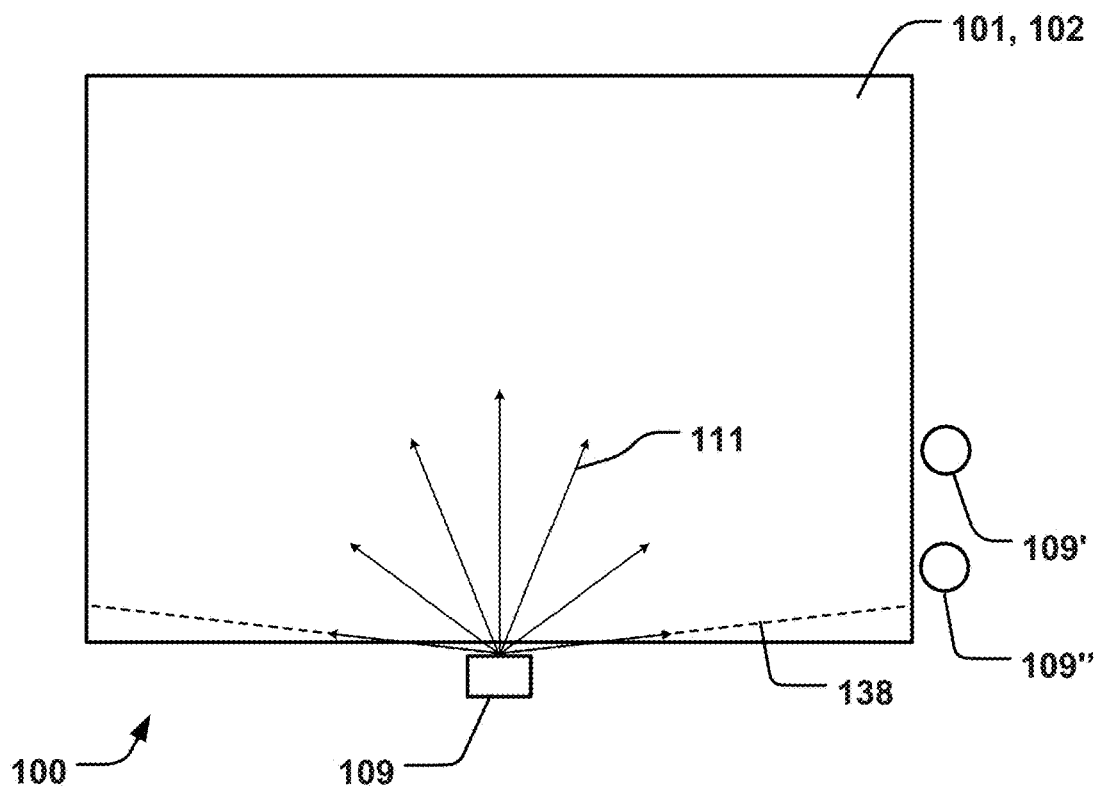
FIG. 2b is a schematic illustration, in a top-down view, of a light transmissive apparatus according to one example.
Figure 2C:
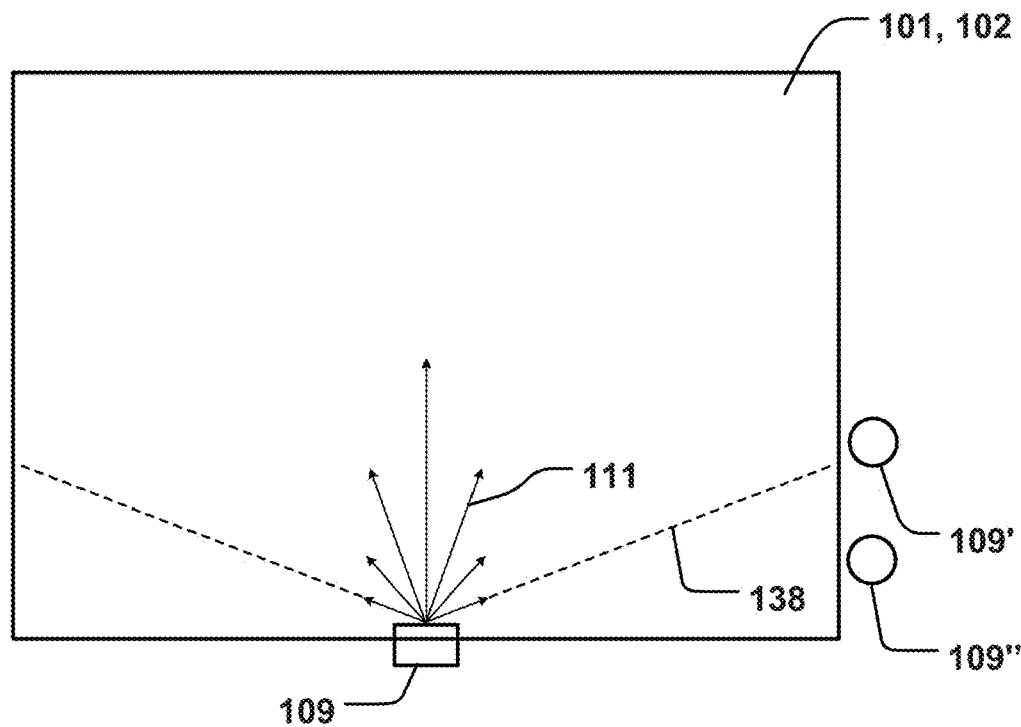
FIG. 2c is a schematic illustration, in a top-down view, of a light transmissive apparatus according to the prior art.
Figure 3:
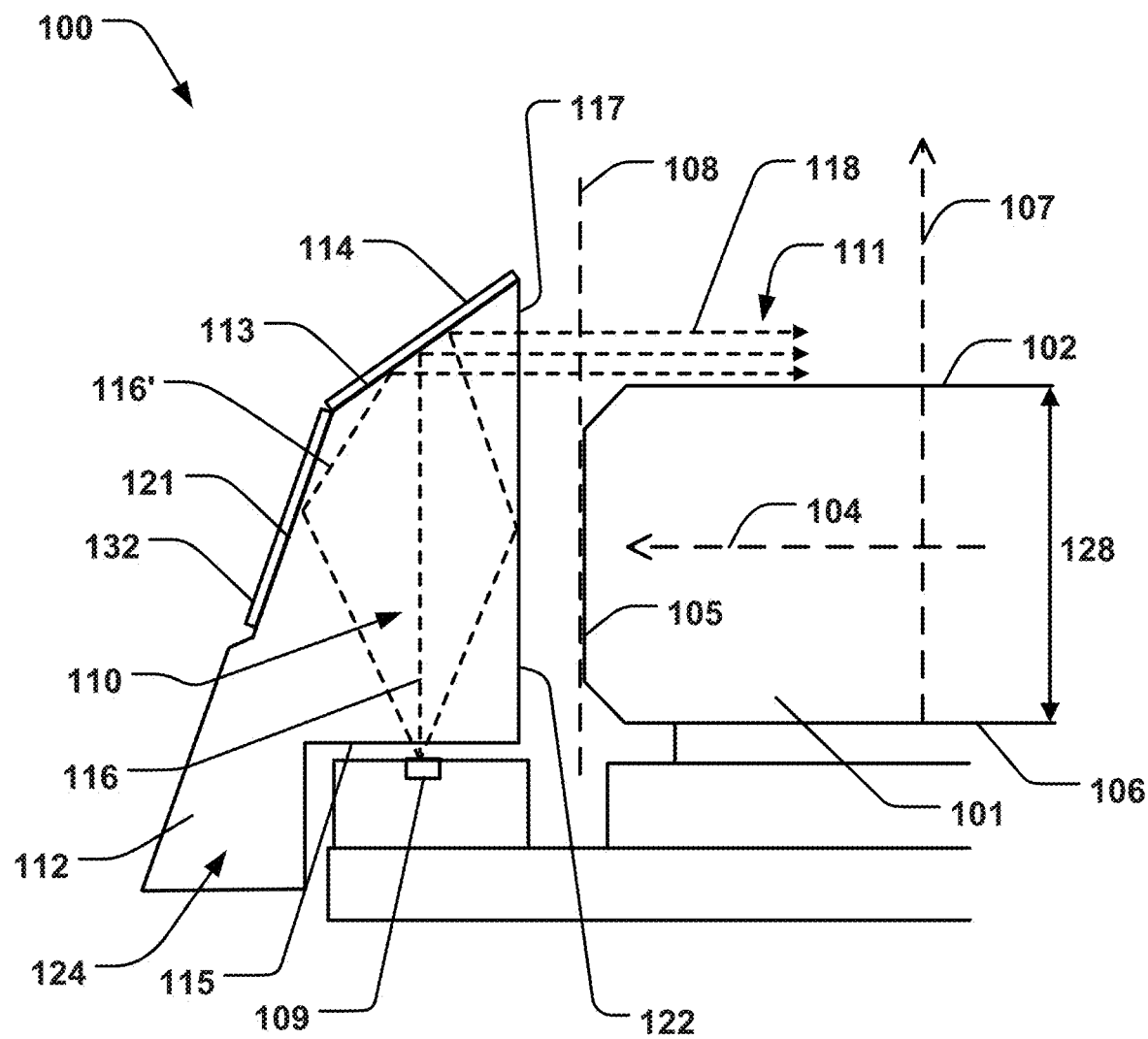
FIG. 3 is a schematic illustration, in a cross-sectional side view, of a detail of a light transmissive apparatus according to one example.

FIG. 2b illustrates a top down-view of the touch sensing apparatus 100. The optimized diffusive scattering of light above and across the touch surface 102 as elucidated above provides for diffusive scattering of light 111 from the emitters 109 over a wide angle across the touch surface 102, compared to the case when the light 111 from emitter 109 needs to be transmitted through the light transmissive panel 101, which is illustrated in FIGS. 1 and 2c. A higher intensity of the light 111 can thus be maintained by means of the touch sensing apparatus 100. The length of the arrows in FIGS. 2b and 2c are proportional to the light intensity. FIG. 2b illustrate how the increased width of the light field 138 will increase the number of detectors 109', 109", that can detect the emitted light 111, thus increasing the number of detection lines and thereby the accuracy of the touch sensing apparatus 100.

The diffusor 135 illustrated in FIG. 1, must normally be protected from mechanical interaction as well as from dirt and ambient light requiring a dust shield 136 forming a physical barrier preventing the dust from reaching diffusor 135 and a transparent window 137 through which the light signal may pass unhindered. Further components such as an edge cover may also be required in these solutions. This complicates assembly and increase cost. Moreover, the sealing window 137 will introduce unwanted Fresnel reflection losses especially at high angles (Q) of the light relative the touch surface, leading to problems with complete coverage of emission from one specific side to all detectors at the three opposing sides. The Fresnel reflexes will also generate additional unwanted light paths that will reduce the apparent attenuation on some detection lines, especially when they run parallel to and near a sealing window, these Fresnel reflexes may also result in artefacts and false touch information.

Having the diffusive light scattering element 114, 114', arranged at least partly outside the panel sides 105, also free up the peripheral space around the edges of the touch surface 102, since substantially all components can be moved outside the edges 105. This also provides for a substantially flush surface across the edges 105 of the panel 101, since nothing needs to be placed on top of the touch surface 102. This will all together allow for a more compact touch sensing apparatus 100. In this regard, the fact that the diffusive light scattering element 114 provides for diffusively scattered light in an efficient manner, as elucidated above, will further contribute to reducing the complexity and increase the compactness of the touch sensing apparatus 100. Such synergy is due to the diffusive light scattering element 114 having the ability to act as a secondary light source for many different types of emitters 109 and for many different relative orientations between the emitter 109 and the diffusive light scattering element 114, as long as the light from the emitter 109 hits the diffusive light scattering element 114 with a proper extent and at a proper location. Since the diffusive light scattering element 114 more or less randomly re-distributes the incoming light, the importance of the luminance profile of the emitter 109 is reduced or even eliminated.

One or more emitters 109 may be arranged to illuminate the diffusive light scattering element 114 simultaneously, for the same detection line. This provides for further increasing the intensity of the light. Similarly, a plurality of detectors 109' may be used to detect light from a single detection line. Further, the spacing between the emitters 109 and the detectors 109' may be varied to affect the spacing of the "virtual" emitters and detectors 109, 109', at the diffusive light scattering elements 114, 114', to control the width of the detection lines, i.e. affecting the width of each individual detection line of the light field 138 in FIG. 2b. Enabling the use of "virtual" emitter—and detector pairs, thanks to the diffusive light scattering element 114 being arranged as discussed, thus allows for a highly customizable touch sensing apparatus where several emitter- and detector pairs can be added to each detection line, or overlapped, depending on e.g. the size of the touch surface 102 that is to be manufactured. This allows also improved control of the attenuation of the detection light.

With respect to the discussion above, "diffuse reflection" refers to reflection of light from a surface such that an incident ray is reflected at many angles rather than at just one angle as in "specular reflection". Thus, a diffusively reflecting element will, when illuminated, emit light by reflection over a large solid angle at each location on the element. The diffuse reflection is also known as "scattering". Accordingly, the diffusive light scattering element 114 will act as a light source ("secondary light source") to emit diffuse light. The secondary light source thereby defines the actual origin of the detection lines that are generated by the light from the respective emitter 109.

Figure 8:
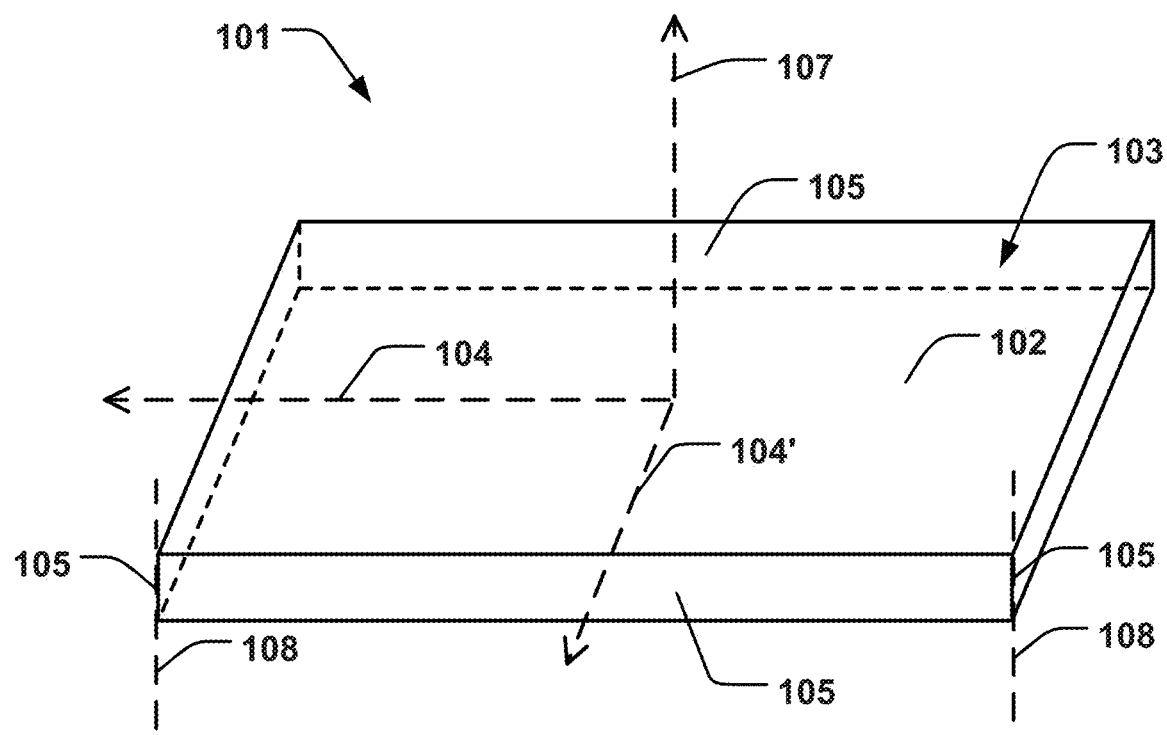
FIG. 8 is a schematic illustration, in a perspective view, of a detail of a light transmissive apparatus according to one example.

The light emitters 109 and/or the light detectors 109' may be arranged outside the panel sides 105, as shown in the examples in e.g. FIGS. 2 and 3. I.e. the light emitters 109 and/or the light detectors 109' may be arranged radially outside the perimeter 108 of the panel 101, in a radial direction 104, 104'. The radial direction 104, 104' is perpendicular to a normal axis 107 of a plane 103 in which the light transmissive panel 101 extends, as illustrated in FIG. 8. Arranging the light emitters 109 and/or the light detectors 109' outside the panel sides 105 provides for an efficient and simple coupling of the light emitted or received therefrom to the first reflective surface 113, 113', and the diffusive light scattering element 114, 114', thereof, which is also arranged outside the panel sides 105. Loss of available light is thereby minimized, and the alignment requirements are relaxed, which is beneficial for mass production.

The light emitters 109 and/or the light detectors 109' may furthermore be aligned opposite the first reflective surface 113, 113'. This will further allow for efficiently directing the emitted light 110 to the first reflective surface 113 and the diffusive light scattering element 114 thereof. This is beneficial with respect to effectively moving the light source to the "secondary" light position above the touch surface 102, as discussed above, since more of the available light may now be diffusively scattered above the touch surface 102. Light 110 emitted from the light source 109 has an intensity profile which, due to aligning the light source 109 opposite the first reflective surface 113, may have a maximum intensity along an axis that coincides with the location of the first reflective surface 113. Similarly, detector 109' may receive the maximum amount of detection light 110' when arranged opposite the first reflective surface 113'. 'Arranged opposite' may thus be construed as having the light emitters 109 and/or the light detectors 109' facing the first reflective surface 113, 113' along a direction parallel to a normal axis 107 of a plane 103 in which the light transmissive panel 101 extends. An axis along which the intensity of emitted light assumes a maximum may thus also be aligned in parallel with the normal axis 107. In other embodiments, the axis along which the intensity of emitted light assumes a maximum may be within a few degrees of normal axis 107.

Turning to FIGS. 3 and 5, the light guide 112 may comprise a first light coupling surface 115 facing the light emitters 109 and/or the light detectors 109'. The first light coupling surface 115 is arranged to direct the emitted light 110, received from the emitter 109, to the first reflective surface 113 and the diffusive light scattering element 114 thereof, and vice versa with respect to directing light to detector 109'. The extension of the first light coupling surface 115 in a radial direction 104, 104', perpendicular to a normal axis 107 of the plane 103 in which the light transmissive panel extends, may overlap at least partly with the extension of the first reflective surface 113, 113', in the radial direction 104, 104'. Thereby a first set of light beams 116 has a light path that extends in a direction substantially parallel with the normal axis 107 between the first light coupling surface 115 and the first reflective surface 113, 113', as illustrated in FIGS. 3 and 5. This ensures that no further internal reflections in the light guide 112 are necessary in order for the light to propagate between the first light coupling surface 115 and the first reflective surface 113, 113'. This will provide for further optimization in maintaining as much light as possible, since internal reflections may result in some loss of the available light.

The first light coupling surface 115 may be aligned substantially in parallel with the plane 103 in which the light transmissive panel 101 extends, as illustrated in e.g. FIGS. 3 and 5. Reflections in directions which are not parallel with the normal axis 107 of the plane 103 are thus minimized. As elucidated above, this is particularly advantageous when aligning the axis along which the maximum light intensity occurs, when emitted from light source 109, in the same direction, i.e. parallel with the normal axis 107. The distance between the first light coupling surface 115 and the emitter and/or detector 109' may be varied to achieve the maximum light coupling efficiency. The form of the first light coupling surface 115 may also be varied, e.g. having a convex surface for collimation of light.

Turning again to FIGS. 3 and 5, the light guide 112 may comprise a second light coupling surface 117 arranged at least partly above the touch surface 102 to direct light from the first reflective surface 113, 113', to above the touch surface. The extension of the second light coupling surface 117 along the normal axis 107 of the plane 103 may overlap at least partly with the extension the first reflective surface 113, 113', along the normal axis 107. Thereby a second set of light beams 118 has a light path that may extend in a direction substantially parallel with the radial direction 104, 104', and perpendicular to the normal axis 107, between the first reflective surface 113, 113', and the second light coupling surface 117. This ensures that no further internal reflections in the light guide 112 are necessary in order for the light to propagate between the first reflective surface 113, 113', and the second light coupling surface 117. This will provide for further optimization in maintaining as much light as possible that is diffusively reflected to above the touch surface 102. The light beams 118 propagating above the touch surface 102 will have a certain angle of spread, i.e. downwards and upwards from the surface 102, such that some light 118 will be reflected in the touch surface 102.

The second light coupling surface 117 may be aligned substantially in parallel with the normal axis 107, as illustrated in e.g. FIGS. 3 and 5. Reflections in directions which are not perpendicular with the normal axis 107 of the plane 103 are thus minimized, and it will be easier to control the characteristics of the diffusively reflected light via the angle of the first reflective surface 113, 113', only.

The light guide 112 may comprise a second reflective surface 121 intersecting the first reflective surface at an angle 127, as illustrated in FIGS. 3, 4a, 5 and 6. A first set of light beams 116' may thus be reflected by scattering between the first 113, 113', and second reflective surfaces 121, as illustrated in e.g. FIG. 4a. A greater portion of the emitted light 110 may thereby be directed to the first reflective surface 113, 113'. This enhances the efficiency of the diffusive emission from the diffusive light scattering element 114, 114', as a secondary light source. Vice versa, a greater portion of detection light 110' may be directed from the first reflective surface 113, 113', to the detector 109'.

Figure 4A:
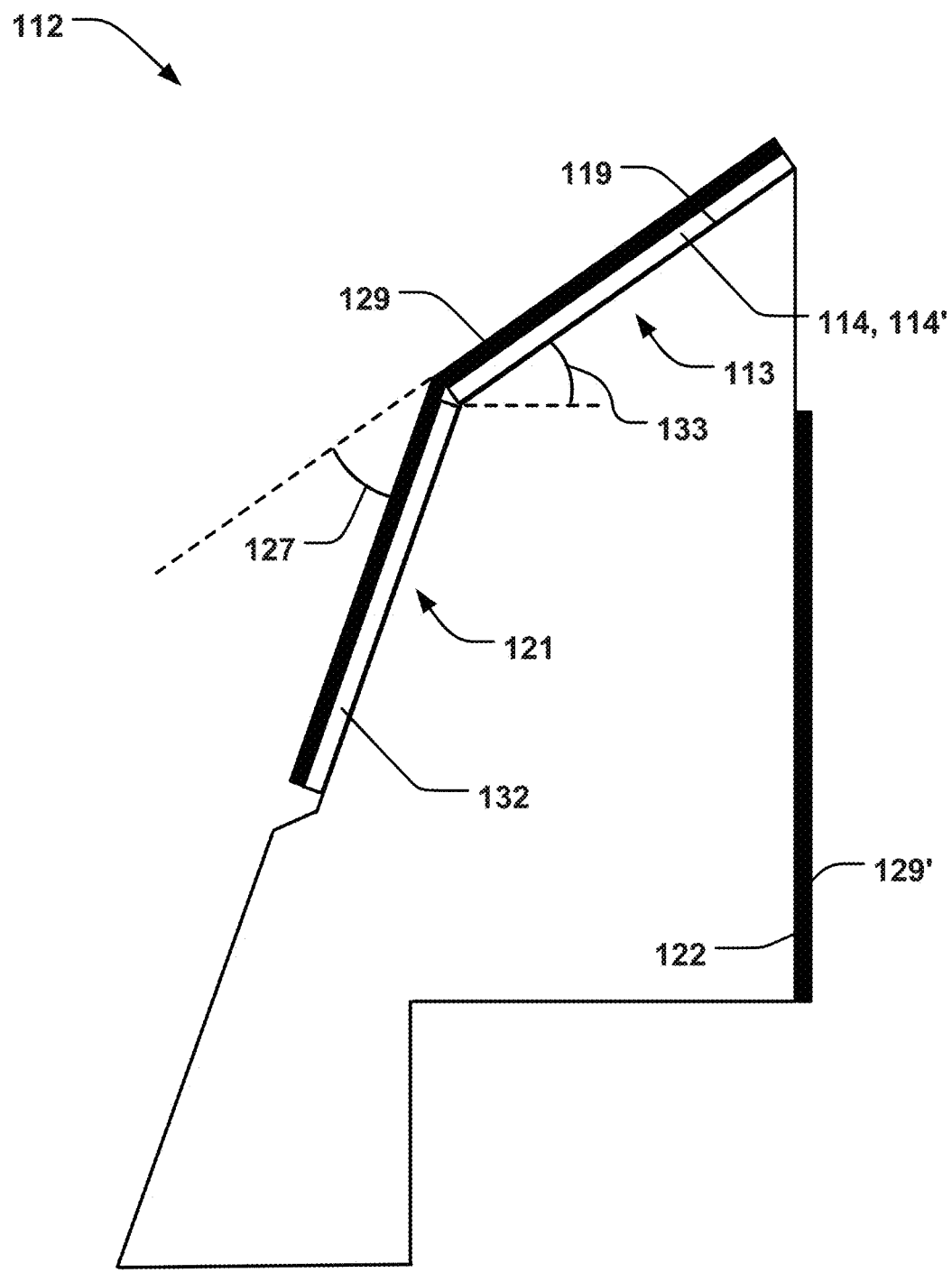
FIGS. 4a-b are schematic illustrations, in cross-sectional side views, of a detail of a light transmissive apparatus according to one example.
Figure 6:
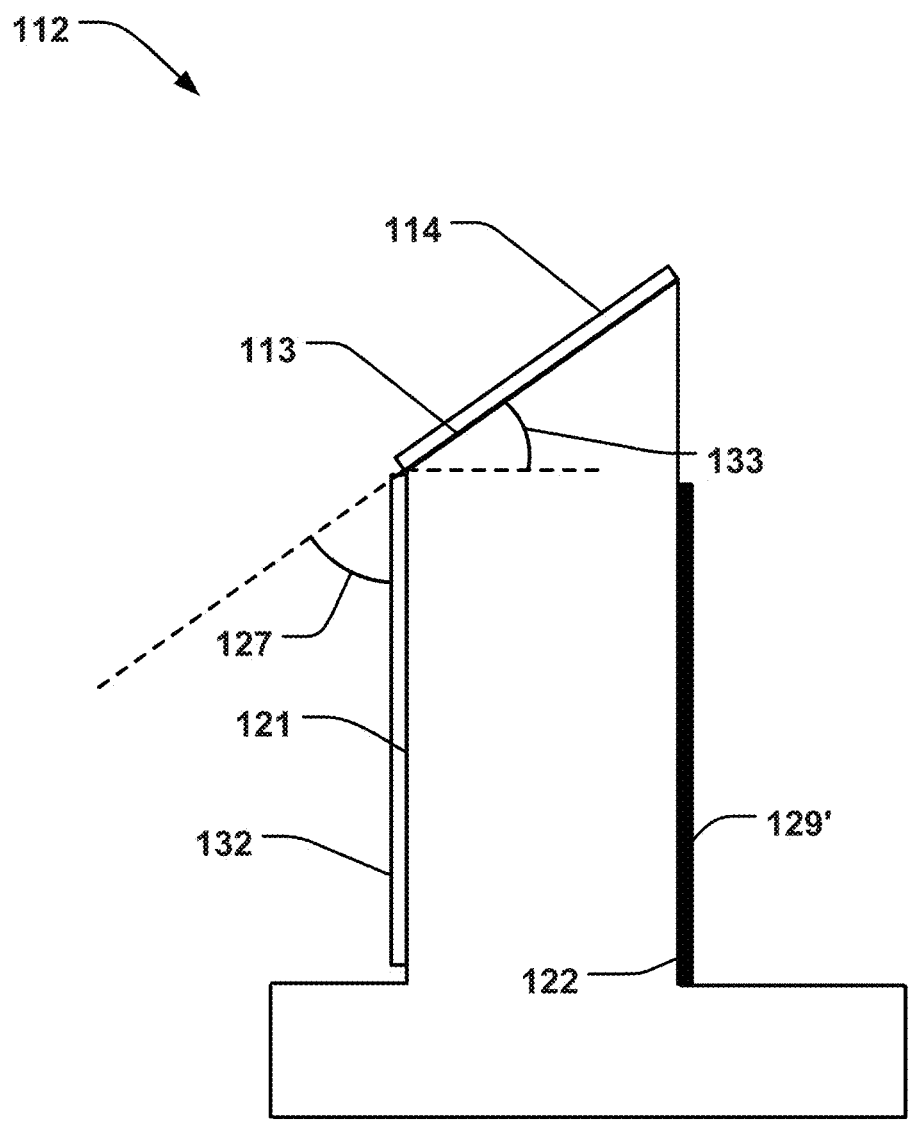
FIG. 6 is a schematic illustration, in a cross-sectional side view, of a detail of a light transmissive apparatus according to one example.

The diffusive light scattering element 114, 114', may extend along both the first 113, 113', and second 121 reflective surfaces, as illustrated with the extended diffusive light scattering element 132 in e.g. FIGS. 4a and 6. Emitted light 110 from the light source 109 that is reflected on the second reflective surface 121 will thus be diffusively scattered. A greater portion of the reflected light may in certain configurations of the touch sensing apparatus 100 then be reflected towards the first reflective surface 113. Similarly, having a diffusive light scattering element 132 at the second reflective surface 121 of a light guide 121 at a detector 109', may provide for increasing the amount of detection light 110' received from the second reflective surface 121. Alternatively, in some applications, a specularly reflective element may be provided on the second reflective surface 121, which may be particularly advantageous in the example in FIGS. 5 and 6 where the second reflective surface is substantially perpendicular with the touch surface 102. The third reflective surface 122 may in this example also be specularly reflective. Light may then be specularly reflected inside the light guide 112 until it reaches the diffusively scattering element 114.

The light guide 112 may comprise a third reflective surface 122 facing the panel sides 105, as illustrated in FIGS. 3 and 5. The third reflective surface 122 may extend along the entire thickness 128 of the light transmissive panel 101, in parallel with a normal axis 107 of a plane 103 in which the light transmissive panel extends, as further shown in FIGS. 3 and 5. Any emitted light 110 that may propagate in the light guide 112 in a direction towards the edge 105 of the panel 101 may thus be reflected either by specular reflection in a reflective coating or film or by total internal reflection on the third reflective surface 122 towards the first reflective surface 113, 113'. Detection light 110' may in a similar manner be reflected against the third reflective surface 122 towards the detector 109'.

The third 122 and second 121 reflective surfaces may be parallel, as illustrated in FIGS. 5 and 6. This may provide for an advantageous configuration in some applications, where the profile of the light guide 112 in the radial direction 104, 104', may have to be reduced, to provide a compact and robust light guide 112 while attaining highly optimized diffusively scattered light as elucidated above.

Furthermore, the third 122 and second 121 reflective surfaces may be parallel along the entire thickness 128 of the light transmissive panel 101, as in the example of FIG. 5.

Figure 7A:
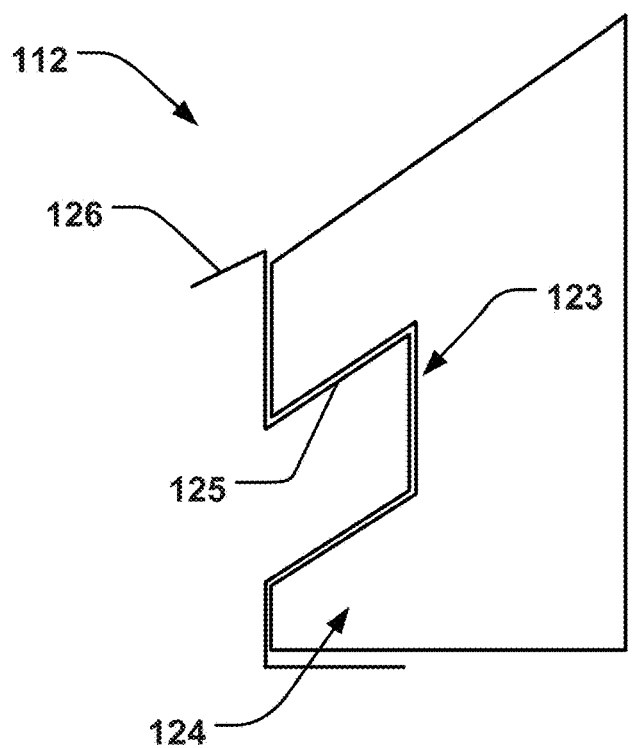
FIGS. 7a-b are schematic illustrations, in cross-sectional side views, of a detail of a light transmissive apparatus according to one example.
Figure 7B:
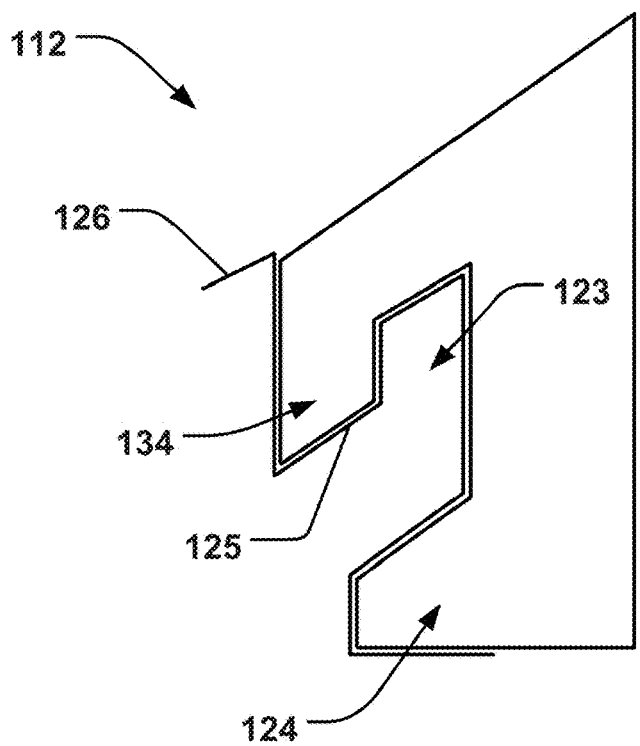

The light guide 112 may comprise a recess 123 or a protrusion 124 for interlocking with a correspondingly mating locking surface 125 of a frame element 126 of the touch sensing apparatus 100, as schematically illustrated in FIGS. 7a-b. This provides for efficiently securing the light guide 112 to the frame element 126, and thereby providing a robust touch sensing apparatus 100 and accurate alignment of the light guide 112 in relation to the emitters 109, detectors 109', and the panel 101. In FIGS. 7a-b, both recesses 123 and protrusions 124 interlock with a corresponding locking surface 125 of the frame element 126. I.e. the recess 123 of the light guide 112 receives a protruding locking surface 125 of the frame element 126, and vice versa for the protrusion 124 of the light guide 112. FIG. 7b illustrates an additional protrusion 134 extending in a direction parallel with the normal axis 107 of the plane 103, when the light guide 112 is mounted in the panel 101. This may provide for further increasing the stability of the fixation, e.g. preventing twisting of the light guide 112, while at the same time ensuring that stress on the light guide 112 is avoided.

The diffusive light scattering element 114, 114', may be configured as an essentially ideal diffuse reflector, also known as a Lambertian or near-Lambertian diffuser, which generates equal luminance from all directions in a hemisphere surrounding the diffusive light scattering element 114, 114'. Many inherently diffusing materials form a near-Lambertian diffuser. In an alternative, the diffusive light scattering element 114, 114', may be a so-called engineered diffuser, e.g. a holographic diffuser. The engineered scattering element 114, 114', may also be configured as a Lambertian diffuser. In a variant, the engineered diffuser is tailored to promote diffuse reflection into certain directions in the surrounding hemisphere, in particular to angles that provides for the desired propagation of light above and across the touch surface 102.

The diffusive light scattering element may be configured to exhibit at least 50% diffuse reflection, and preferably at least 90% diffuse reflection.

Many materials exhibit a combination of diffuse and specular reflection. Specularly reflected light may result in coupling losses between the emitter, detector and the associated component therebetween. It is thus preferred that the relation between diffusive and specular reflection is high for the diffusive light scattering element 114, 114'. It is currently believed that reasonable performance may be achieved, at least for smaller touch surfaces, when at least 50% of the reflected light is diffusively reflected. Preferably, diffusive light scattering element 114, 114', is designed to reflect incoming light such that at least about 60%, 70%, 80%, 90%, 95%, or 99% of the reflected light is diffusively reflected.

There are inherently diffusing materials that promote diffuse reflection into certain directions and that may be arranged on the first reflective surface 113, 113', to form the diffusive light scattering element 114, 114'. Thus, the diffusive light scattering element 114, 114', may comprise a material of varying refractive index.

The diffusive light scattering element 114, 114', may be implemented as a coating, layer or film applied to the first reflective surface 113, 113', e.g. by painting, spraying, lamination, gluing, etc.

The diffusive light scattering element 114, 114', may thus be arranged on an external surface 119 of the light guide 112 at the first reflective surface 113, as schematically illustrated in FIG. 4a.

In one example, the scattering element 114, 114' is implemented as matte white paint or ink applied to the first reflective surface 113, 113'. In order to achieve a high diffuse reflectivity, it may be preferable for the paint/ink to contain pigments with high refractive index. One such pigment is $TiO_2$, which has a refractive index $n=2.8$. It may also be desirable, e.g. to reduce Fresnel losses, for the refractive index of the paint filler and/or the paint vehicle to match the refractive index of the surface material in the external surface 119. The properties of the paint may be further improved by use of EVOQUE™ Pre-Composite Polymer Technology provided by the Dow Chemical Company.

There are many other coating materials for use as a diffuser that are commercially available, e.g. the fluoropolymer Spectralon, polyurethane enamel, barium-sulphate-based paints or solutions, granular PTFE, microporous polyester, GORE® Diffuse Reflector Product, Makrofol® polycarbonate films provided by the company Bayer AG, etc.

Alternatively, the diffusive light scattering element 114, 114', may be implemented as a flat or sheet-like device, e.g. the above-mentioned engineered diffuser or white paper, which is attached to the external surface 119 by an adhesive. According to other alternatives, the diffusive light scattering element 114, 114', may be implemented as a semi-randomized (non-periodic) micro-structure on the external surface 119 with an overlying coating of reflective material.

Figure 4B:
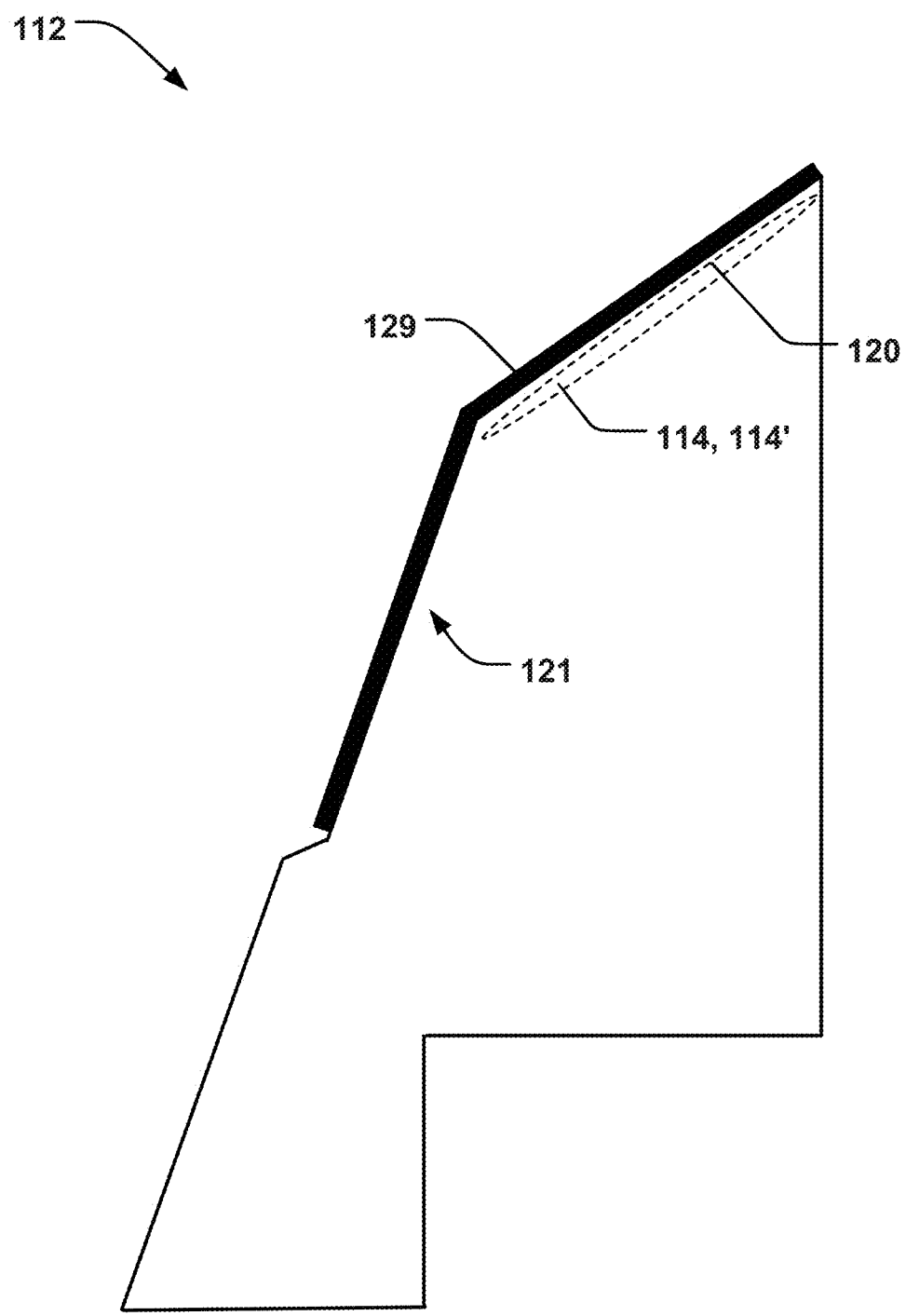

The diffusive light scattering element 114, 114', may also be incorporated into an internal surface 120 of the light guide 112 at the first reflective surface 113, 113', as schematically illustrated in FIG. 4b. For example, a micro-structure may be provided on the external or internal surfaces 119, 120, by etching, embossing, molding, abrasive blasting, etc. The diffusive light scattering element 114, 114', may comprise pockets of air along the internal surface 120, that may be formed during a molding procedure of the light guide 112. It may also be possible to incorporate a film of diffusive properties into the internal surface 120 when forming the light guide 112. In another alternative, the diffusive light scattering element 114, 114', may be light transmissive (e.g. a light transmissive diffusing material or a light transmissive engineered diffuser) and covered with a coating of reflective material.

Thus, the diffusive light scattering element 114, 114', may comprise one of; white- or colored paint, white- or colored paper, Spectralon, a light transmissive diffusing material covered by a reflective material, diffusive polymer or metal, an engineered diffuser, a reflective semi-random micro-structure, in-molded air pockets or film of diffusive material.

The touch sensing apparatus may further comprise a shielding layer 129 which is applied onto the diffusive light scattering element 114, 114', as schematically illustrated in FIGS. 4a-b. The shielding layer 129 may define an opaque frame around the perimeter 108 of the light transmissive panel 102. The shielding layer 129 may increase the efficiency in providing the diffusively reflected light in the desired direction, e.g. by recycling the portion of the light that is diffusively reflected by the diffusive light scattering element 114, 114', in a direction away from the panel 101. Similarly, providing a shielding layer 129 on the light guide 112 arranged at a detector 109' reduce the amount of stray light and ambient light that reaches the detector 109'. The shielding layer 129 may have the additional function of blocking entry of ambient light through the light guide 112. Also, the third reflective surface 122 may be provided by a shielding layer 129', as illustrated in FIGS. 4a and 6. This is advantageous e.g. when it is desired to have a gasket between the panel 101 and the light guide 112, that otherwise would absorb the reflected light.

The panel 101 may be made of any solid material (or combination of materials) that transmits a sufficient amount of light in the relevant wavelength range to permit a sensible measurement of transmitted energy. Such material includes glass, poly(methyl methacrylate) (PMMA) and polycarbonates (PC). The panel 101 may be designed to be overlaid on or integrated into a display device or monitor (not shown).

The light guide 112 may be made from dark colored pmma resin. This allows the light guide to function as a daylight filter, only allowing NIR light to pass. Other possible materials are Acryrex or Acrypet.

As used herein, the emitters 109 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 109 may also be formed by the end of an optical fiber. The emitters 109 may generate light in any wavelength range. The following examples presume that the light is generated in the infrared (IR), i.e. at wavelengths above about 750 nm. Analogously, the detectors 109' may be any device capable of converting light (in the same wavelength range) into an electrical signal, such as a photo-detector, a CCD device, a CMOS device, etc.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, inside a light transmissive panel and detecting, at a number of detectors, a change in the received light caused by an interaction with the transmitted light at the point of touch.

What is claimed is:

1. A touch sensing apparatus, comprising:
a light transmissive panel extending in a plane and that defines a touch surface, an opposite rear surface, and panel sides extending between the touch surface and rear surface, the panel sides defining a perimeter of the light transmissive panel,
a plurality of light emitters and detectors arranged along the perimeter and adjacent the panel sides,
a light guide arranged along the perimeter,
wherein the light emitters are arranged to emit a respective beam of light onto the light guide and configured to generate propagating light that propagates above the touch surface,
wherein the light detectors are arranged to receive detection light generated responsive to propagating light impinging on the light guide,
wherein the light guide comprises a first light coupling surface facing the light emitters and/or the light detectors,
wherein the first light coupling surface is aligned substantially in parallel with the plane in which the light transmissive panel extends, and
wherein the beam of light is internally reflected between at least two reflective surfaces of the light guide being angled relative to each other.

2. The touch sensing apparatus according to claim 1, wherein the light emitters and/or the light detectors are arranged outside the panel sides.

3. The touch sensing apparatus according to claim 1, wherein the light guide comprises a second light coupling surface arranged at least partly above the touch surface, wherein the second light coupling surface is aligned substantially in parallel with a normal axis of the plane.

4. The touch sensing apparatus according to claim 1, wherein the at least two reflective surfaces of the light guide comprise a first reflective surface and second reflective surface intersecting at an angle.

5. The touch sensing apparatus according to claim 1, wherein the light guide comprises a recess or a protrusion for interlocking with a correspondingly mating locking surface of a frame element of the touch sensing apparatus.

6. The touch sensing apparatus according to claim 1, wherein a protrusion of the light guide is configured to interlock with a recess of a frame element.

7. The touch sensing apparatus according to claim 1, wherein the propagating light is diffusively reflected by the light guide.

* * * * *